United States Patent
Abtin et al.

(10) Patent No.: US 12,095,827 B2
(45) Date of Patent: Sep. 17, 2024

(54) FIRST NODE, SECOND NODE AND METHODS PERFORMED THEREBY FOR HANDLING IDENTIFICATION OF A COMMUNICATIONS NETWORK

(71) Applicant: Telefonaktiebolaget LM Ericsson (publ), Stockholm (SE)

(72) Inventors: Afshin Abtin, Sollentuna (SE); Mats Buchmayer, Enskede Gard (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 204 days.

(21) Appl. No.: 17/790,652

(22) PCT Filed: Jan. 12, 2021

(86) PCT No.: PCT/SE2021/050012
§ 371 (c)(1),
(2) Date: Jul. 1, 2022

(87) PCT Pub. No.: WO2021/145814
PCT Pub. Date: Jul. 22, 2021

(65) Prior Publication Data
US 2023/0045195 A1     Feb. 9, 2023

Related U.S. Application Data

(60) Provisional application No. 62/960,747, filed on Jan. 14, 2020.

(51) Int. Cl.
*H04W 8/12* (2009.01)
*H04L 65/1073* (2022.01)
(Continued)

(52) U.S. Cl.
CPC ...... *H04L 65/1073* (2013.01); *H04L 65/1095* (2022.05); *H04W 8/06* (2013.01); *H04W 8/12* (2013.01)

(58) Field of Classification Search
CPC .................................. H04W 8/06; H04W 8/12
See application file for complete search history.

(56) References Cited

U.S. PATENT DOCUMENTS

| | | | |
|---|---|---|---|
| 9,204,290 B2 | 12/2015 | Engstrom et al. | |
| 2008/0101568 A1* | 5/2008 | Ropolyi | H04M 15/00 379/114.01 |

(Continued)

FOREIGN PATENT DOCUMENTS

| | | |
|---|---|---|
| CN | 103210630 A | 7/2013 |
| CN | 104469862 A | 3/2015 |

(Continued)

OTHER PUBLICATIONS

3rd Generation Partnership Project, "3rd Generation Partnership Project; Technical Specification Group Services and System Aspects; IP Multimedia Subsystem (IMS); Stage 2 (Release 16)", Technical Specification, 3GPP TS 23.228 V16.3.0, Dec. 1, 2019, pp. 1-347, 3GPP, France.

(Continued)

*Primary Examiner* — Michael T Vu
(74) *Attorney, Agent, or Firm* — COATS & BENNETT, PLLC

(57) ABSTRACT

A method performed by a first node (111) managing a P-CSCF in a first communications network (101). The method is for handling identification of a second communications network (201). One of the communications networks is a home network and the other is a visited network. The first node (111) obtains (701) a unique identifier uniquely identifying the second communications network (201) in a plurality of networks (200) sharing a Mobile Network identifier. The unique identifier is based on: a) an MCC and an MNC, corresponding to a shared PLMN identifier, and b) a subscriber identifier corresponding to the second network (201). The first node (111) also processes (Continued)

(702) provision of an IMS service across the communications networks, to a device (230) operating in the visited network, based on the identifier. The processing (702) comprises, in the home network, one of: i) application of a policy or rule, and ii) routing a communication to a S-CSCF.Publ.

36 Claims, 13 Drawing Sheets

(51) Int. Cl.
*H04L 65/1095* (2022.01)
*H04W 8/06* (2009.01)

(56) References Cited

U.S. PATENT DOCUMENTS

| | | |
|---|---|---|
| 2012/0106468 A1 | 5/2012 | Engstrom et al. |
| 2015/0312834 A1 | 10/2015 | Patil et al. |
| 2016/0183169 A1 | 6/2016 | Horn et al. |
| 2016/0295025 A1* | 10/2016 | Huggett .............. H04M 15/57 |
| 2018/0077559 A1 | 3/2018 | Liu |
| 2019/0373535 A1 | 12/2019 | Singh |
| 2022/0070649 A1* | 3/2022 | Sahin ................ H04L 65/1073 |

FOREIGN PATENT DOCUMENTS

| | | |
|---|---|---|
| CN | 106878477 A | 6/2017 |
| CN | 107113698 A | 8/2017 |
| JP | 2014131313 A | 7/2014 |
| WO | 2018133949 A1 | 7/2018 |
| WO | 2019027803 A1 | 2/2019 |
| WO | 2019087045 A1 | 5/2019 |

OTHER PUBLICATIONS

CBRS Alliance, "CBRS Alliance Identifier Guidelines for Shared HNI", CBRSA-TR-0100 V1.0.0, Nov. 27, 2018, pp. 1-18, CBRS Alliance.
GSM Association, "Ims Roaming and Interworking Guidelines", Version 18.0, Jan. 8, 2016, pp. 1-53, GSMA.
CBRS Alliance, "CBRS Network Services Stage 2 and 3 Specification", CBRSA-TS-1002 v 3.0.0, Feb. 18, 2020, pp. 1-55, CBRSA.
Dekok, A., "The Network Access Identifier", Internet Engineering Task Force (IETF) Request for Comments: 7542, May 2015, pp. 1-30, IETF.
Alliance for Telecommunications Industry Solutions, "Neutral Host Solutions for 5G Multi-Operator Deployments in Managed Spaces", ATIS-I-0000073, Jul. 25, 2019 pp. 1-49, ATIS.

* cited by examiner a)

b)

a)

b)

a)

b)

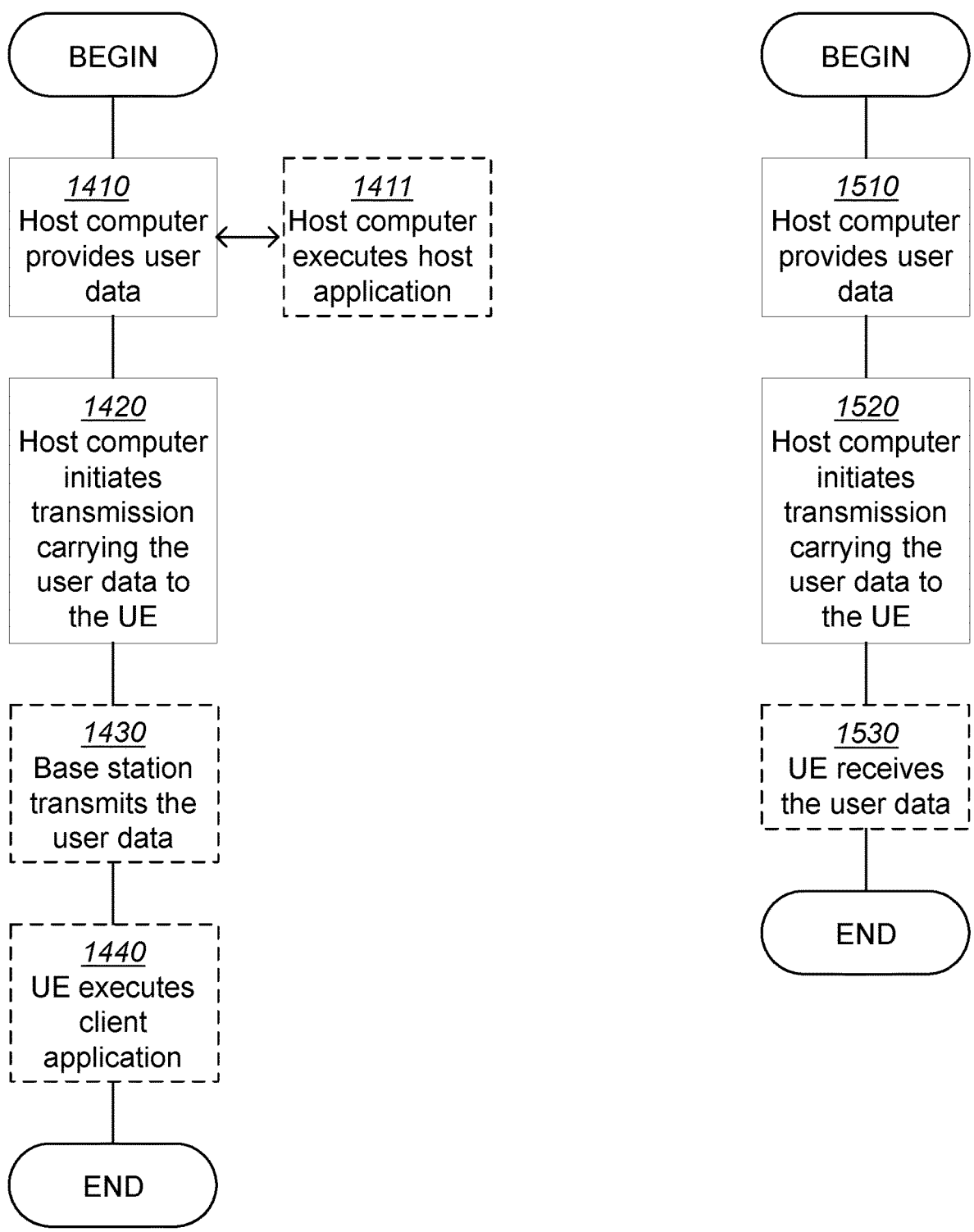

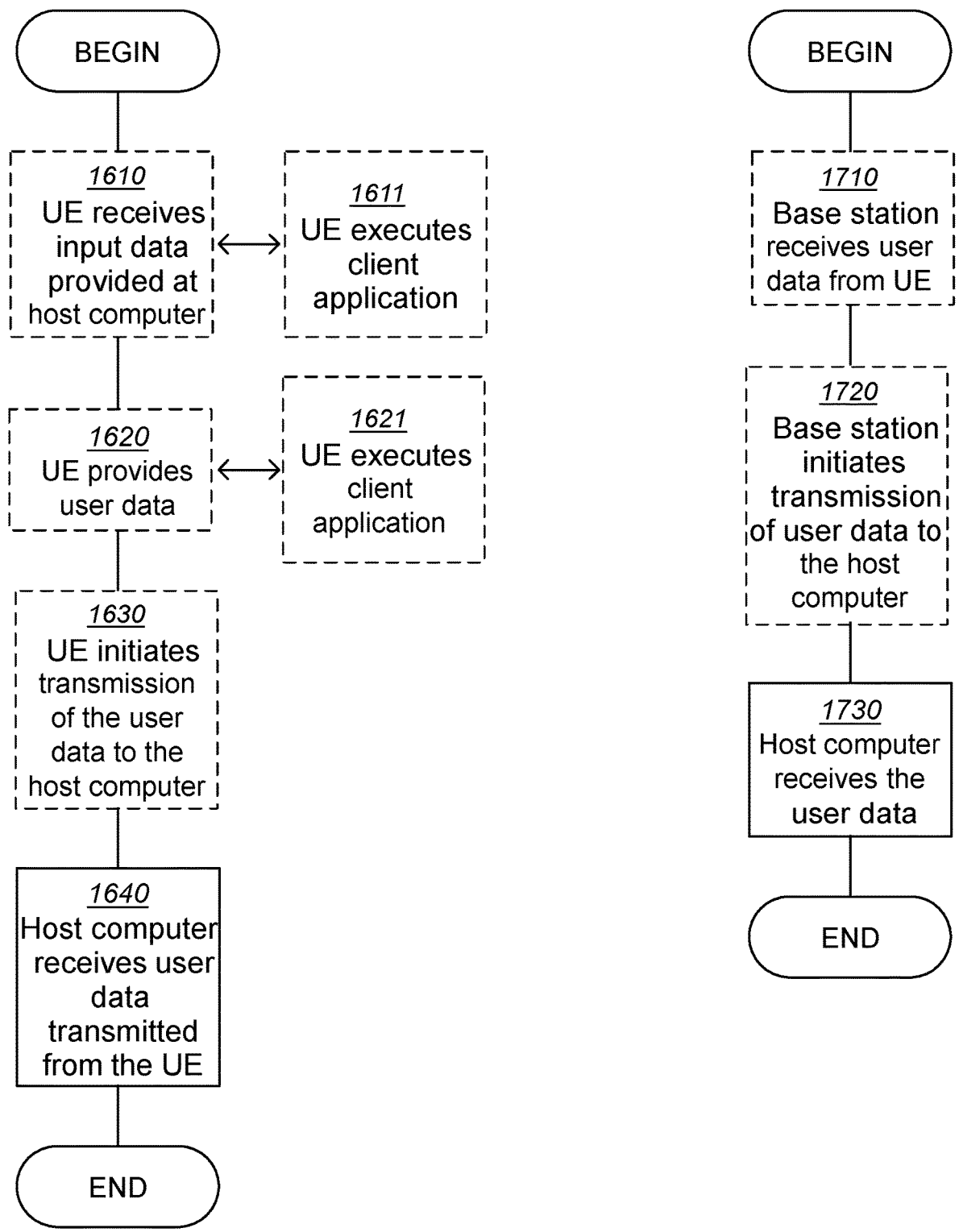

FIRST NODE, SECOND NODE AND METHODS PERFORMED THEREBY FOR HANDLING IDENTIFICATION OF A COMMUNICATIONS NETWORK

TECHNICAL FIELD

The present disclosure relates generally to a first node and methods performed thereby for handling identification of a communications network. The present disclosure relates generally to a second node and methods performed thereby for handling identification of a communications network.

BACKGROUND

Nodes within a communications network may be wireless devices such as e.g., User Equipments (UEs), stations (STAs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g., between two wireless devices, between a wireless device and a regular telephone, and/or between a wireless device and a server via a Radio Access Network (RAN), and possibly one or more core networks, comprised within the communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

Nodes may also be network nodes, such as radio network nodes, e.g., Transmission Points (TP). The communications network covers a geographical area which may be divided into cell areas, each cell area being served by a network node such as a Base Station (BS), e.g. a Radio Base Station (RBS), which sometimes may be referred to as e.g., gNB, evolved Node B ("eNB"), "eNodeB", "NodeB", "B node", or BTS (Base Transceiver Station), depending on the technology and terminology used. The base stations may be of different classes such as e.g. Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The communications network may also be a non-cellular system, comprising network nodes which may serve receiving nodes, such as wireless devices, with serving beams. In 3rd Generation Partnership Project (3GPP) Long Term Evolution (LTE), base stations, which may be referred to as eNodeBs or even eNBs, may be directly connected to one or more core networks. In the context of this disclosure, the expression Downlink (DL) may be used for the transmission path from the base station to the wireless device. The so-called 5G system, from a radio perspective started to be standardized in 3GPP, and the so-called New Radio (NR) is the name for the radio interface. NR architecture is being discussed in 3GPP. In the current concept, gNB denotes NR BS, where one NR BS may correspond to one or more transmission/reception points. The expression Uplink (UL) may be used for the transmission path in the opposite direction i.e., from the wireless device to the base station.

The standardization organization 3GPP is currently in the process of specifying a New Radio Interface called New Radio (NR) or 5G-Universal Terrestrial Radio Access (UTRA), as well as a Fifth Generation (5G) Packet Core Network, which may be referred to as Next Generation (NG) Core Network, abbreviated as NG-CN, NGC or 5G CN.

Currently, in the 5G architecture, the concept of network slicing has been introduced, which may be understood as "a set of network functions, and resources to run these network functions, forming a complete instantiated logical network to meet certain network characteristics required by the Service Instance(s)." An instantiated logical network may be understood as a dedicated set of instantiated network resources, software and hardware, that may be understood to form a complete network configuration isolated from other logical network instances, for a set of user terminals authorized to be connected to the logical network instance, that is, a network slice instance.

Network slicing may be understood to primarily comprise the following components: physical resource, logical resource, and network function.

Physical resource may be understood as a physical asset capable of performing computation, storage or transport including radio access. Logical resource may be understood as a partition of a physical resource, or grouping of multiple physical resources dedicated to a Network Function or shared between a set of Network Functions. A Network Function (NF) may be understood to refer to processing functions executing a dedicated task in a network. This may include, but is not limited to, telecommunication nodes functionality, as well as switching functions, e.g., Ethernet switching functions, and Internet Protocol (IP) routing functions.

A Network slice may be defined within a Public Land Mobile Network (PLMN) and may be understood to include a Core Network Control Plane and User Plane Network Functions, and, in the serving PLMN, at least one of the following: the NG Radio Access Network and the N3IWF functions to the non-3GPP Access Network.

In the home network, the PLMN operator may manage and orchestrate the Network Slicing operations for the 5G subscribers. These slicing operations may include: design, instantiate, operate and decommission Network Slices for the 5G subscribers. The slice selection mechanism may be based on PLMN, Access Point Name (APN), UE Usage type, Single Network Slice Selection Assistance Information (S-NSSAI) etc.

However, for the 5G roaming subscribers, there may be two primary mechanisms for the Control Plane signalling: home routed and local breakout.

In the home routed mechanism, also referred to herein as S8 Home Routing (S8HR), the roaming subscriber user plane data plane information may be routed back to the Home Public Land Mobile Network (HPLMN), which may be controlled and administered by the home operator. This mechanism comes with the drawback of considerable latency and Service Level Agreement (SLA) issues.

In the Local breakout (LBO) mechanism, the visited operator may be understood to have the control and mechanism of the roaming subscribers signalling. This mechanism has a limitation which may be understood to be that the home network gets no control of the service and it becomes hard to make it consistent across the networks.

The Citizens Broadband Radio Service (CBRS) Alliance (CBRS-A) defines a standard that may enable 3GPP LTE/4G and NR/5G support in the 3.5 GHz band in the US, 3550-3700 MHz. CBRS-A is currently working on defining the support for release 3 of CBRS Alliance standards, and as part of the work, support for Roaming and IP Multimedia Subsystem (IMS) are in the scope. IMS may be understood as a service engine that may serve subscribers with communication services such as voice, video and messaging.

There are multiple use cases envisioned in this band, and one scenario that has been identified is a deployment when an operator does not have the possibility to acquire a unique PLMN identifier (id). The deployment may be a factory, or smaller Enterprise. To support this scenario, CBRS Alliance has acquired a PLMN id that may be shared among several networks. This may be referred to as a Shared Home Network Identifier (SHNI).

As mentioned above, in a similar manner, 3GPP is currently working on the specification of what is commonly known as 5G. In this effort, use cases to support what may be referred to as non-public networks (NPN) has been identified, and 3GPP has defined a number of different work items to specify the support of NPN.

An NPN may typically be understood as a network that may provide 5G network services to a clearly defined user organization or group of organizations, e.g., a closed set of users in a factory or industrial deployment. There are two alternative versions to support NPN currently being specified, Public Network-Integrated NPN (PNI-NPN) and Stand Alone NPN (SNPN).

In the PNI-NPN solution, an operator may use its own PLMN-id to also integrate an NPN, and the proposal here is to use something similar to the Closed Subscriber Group concept in Evolved Universal Terrestrial Radio Access Network (E-UTRAN) to limit access to the NPN.

In the SNPN solution, a non-public network may be able to use a PLMN id that may be unique or not unique, that is, that may be shared among several deployments. The PLMN id may be coupled with a Network Identifier (NID). The NID may be locally assigned or globally unique.

When a network is deployed using a shared, that is, not uniquely identifiable, PLMN, and this network is required to support roaming users, the home network cannot be identified by Mobile Country Code (MCC)+Mobile Network Code (MNC) alone, since several networks may have same combination. In order to mitigate this problem, CBRS has specified the use of diameter agents, that is, nodes that may perform routing decisions, to route initial authentication messages on International Mobile Subscriber Identity (IMSI) or IMSI block numbers (IBN) between a visited network and a home network, and through these means enable the establishment of a data connection to the Home Public Land Mobile Network (HPLMN) through the Visited Public Land Mobile Network (vPLMN).

The IMSI range for CBRS Home Network Identity (HNI) deployments follows the guidelines documented in CBRSA-TR-0100 V1.0.0_Identifier Guidelines for Shared HNI.docx and depicted in FIG. 1. The schematic diagram of FIG. 1 shows how an IMSI 11 of 15 digits (d), consists of a SHNI 12 of 6 d, and a Mobile Subscriber Identification Number (MSIN) 13 of 9 d. The SHNI 12 consists of an MCC 14 of 3 d and an MNC 15 of 3 d. The MSIN 13 consists of an IBN 16 of 4 d and a Unique Identity Number (UIN) 17 of 5d.

A CBRS operator may be responsible for obtaining at least one IBN for their exclusive use. The IMSI range is administered by the Alliance for Telecommunications Industry Solutions (ATIS) IMSI Oversight Committee (ATIS IOC). The Shared HNI+operator-specific IBN may then form a globally unique operator identifier. The CBRS operator may be understood to be responsible for creating unique identifiers by allocating a different UIN to each subscriber and/or subscription.

When supporting Voice over LTE (VoLTE) IMS roaming, there may be two alternative approaches, S8HR depicted in FIG. 2 and LBO in FIG. 3, which approaches have been briefly described above.

In the S8HR model, all the IMS nodes, that is any of the nodes managing a functional entity per 3GPP definition of IMS architecture, 3GPP TS 23.228 e.g. P-CSCF, S-CSCF, IMS Application Server, may be deployed in the HPLMN 18 and no IMS node may be in the VPLMN 19. Routing back to the HPLMN 18 may be understood to use an existing data path connection and no specific IMS level may be applied, that is the protocol that may carry the IMS media plane, e.g., voice payload. However, IMS nodes in the HPLMN 18 may be understood to be dependent on recognition of the VPMN 19 to enable running VPMN 19 specific policies. Policies may be possible to define on an MCC+MNC combination, and the IMS may retrieve the PLMN-id from the packet core, e.g., via a Policy and Charging Rules Function (PCRF) 20. Depicted in FIG. 2 are the paths followed by a Control Plane for a Session Initiation Protocol (SIP) 21 and a User Plane for a Real-time Transport Protocol (RTP) 22, through a E-UTRAN 23, a Signalling Gateway (SGW) 24, an Mobility Management Entity (MME) 25, a Packet Gateway (PGW) 26, an Interconnection Border Control Function (IBCF)/Transition Gateway (TrGW)/Breakout Gateway Control Function (BGCF)/Media Gateway Control Function (MGCF) 27, a Proxy Call/Session Control Function (P-CSCF) 28, a Home Subscriber Server (HSS) 29, a Serving Call/Session Control Function (SCSCF) 30, a Telephony Application Server (TAS) 31, a Time Division Multiplexing (TDM) or IP eXchange (IPX) connection 32 to another party's network (B-Party) 33, and an IPX connection 34 between the HPLMN 18 and the VPLMN 19.

In the LBO roaming model, the IMS Proxy Call Session Control Function (P-CSCF) 35 and/or IMS Access Gateway (AGW) 36 may be understood to be within the VPLMN 37, while all other IMS nodes may be understood to be in the HPLMN 38. Routing to the HPLMN IMS network may therefore be necessary. Depicted in FIG. 3 are the paths followed by a Control Plane 39 and a Media Plane 40 from a UE 41 through an SGSN 42, a Packet Data Network Gateway (PDN-GW) 44, a E-UTRAN 23, a Signalling Gateway (SGW) 24, a Visited Network-Policy and Charging Rules Function (V-PCRF) 45, an IPX connection 46, a Home-Online Charging System (H-OCS) 47, an S-CSCF 48, and IMS Application Server (AS) 49, and an HSS 50. When LBO is used, the roaming to the home network may be based on SIP level information. The routing information may be based on a home domain name and may be generated per 3GPP 23.003 using MCC and MNC.

The above architectures may apply to roaming in 5G System (5GS), NR and/or 5G Core (5GC), also and applicable to 5G, but the 5GC entities may be as depicted in FIG. 4, for Home routed IMS, and FIG. 5, for LBO IMS.

FIG. 4 corresponds to the Home routed model of roaming in context of a 5G system architecture, S8HR is the name used for 4G roaming. As mentioned in relation to FIG. 2, recognition of the VPMN 19 may be necessary. Depicted in FIG. 4 are the paths followed by a Control Plane 51 and a Media Plane 52 from a UE 53 through a RAN 54, a User Plane Function (UPF) 55 in the VPLM, another UPF 56 in the HPLM, a IBCF/BGCF/MGCF 57, a B-Party 58, an Application Management Function (AMF) 59, a Visited network Session Management Function (V-SMF) 60, a Home SMF (V-SMF) 61, a Home Policy Control Function (H-PCF) 62, a P-CSCF 63, a Serving Call/Session Control Function (S-CSCF) 64, a TAS 65, an Unified Data Management/Home Subscriber Server (UDM/HSS) 66. Also represented are different interfaces between the different nodes, such as N6 67, Sh 68, Cs 69, and Rx or N5 70.

FIG. 5 corresponds to the LBO model of roaming in context of a 5G system architecture. As mentioned in relation to FIG. 3, routing to the HPLMN IMS network may therefore be necessary. Depicted in FIG. 5 are the connections between the different nodes in a VPLMN 71 and an HPLMN 72, as well as the paths that may be followed by a Media Plane 73 from a UE 74 through an Evolved Packet System (EPS)/5GS 75 or a Visited network TrGW 76, a Home network TrGW 77, and a Media Resource Function Processor (MRFP) 78 in a rest of the IMS core 79. The UE's Point of presence (IP-PoP) 80 is also represented. Other nodes in possible paths also represented are a V-PCRF/Visited network PCF (V-PCRF/vPCF) 81, a Home network PCRF (H-PCRF) 82, a P-CSCF 83, a Visited Network IBCF 84, a Home network IBCF 85, and an S-CSCF 86. Also represented are different interfaces between the different nodes, such as a Visited network Ix 87, a Home network Ix 88, Rx or N5 89, Gm 90, S9 91, and Mx 92.

Existing methods, however, may still result in operators being unable to provide roaming subscribers with the network services that they may require, and/or may lead to disruption in the communication services provided.

SUMMARY

As part of the development of embodiments herein, one or more challenges with the existing technology will first be identified and discussed.

In both the LBO and the Home Routed Roaming, e.g., S8HR, roaming models described in the background section, there is a problem to uniquely identify networks when the MCC+MNC combinations cannot be uniquely identified.

The Home routed model for IMS roaming, where the IMS functions may be understood to be in the Home network, may not be able to distinguish among different VPLMNs where their subscriber may be roaming into, since many VPLMNs may share the same MCC+MNC. A differentiation may therefore be needed to enable different polices to be applied. Since the Home network cannot distinguish these as they have same MCC+MNC, an additional identifier may be needed in the Home network in order to identify different visited networks sharing the same MCC+MNC, otherwise all will be treated with same policies. Particularly, for VoLTE Home Routed Roaming, e.g., S8HR roaming, the IMS network in the Home network may need to perform various policies, e.g., disable encryption of IMS Signaling to enable Visited Public Mobile Network (VPMN) Evolved Packet Core (EPC) Lawful Intercept (LI), performing number normalization considering the VPMN number plane and supplementary services execution considering the VPMN. This may be the case, e.g., when a full number format may not have been dialed and the home network may then need to convert the number to correct format considering the VPLMN and how the number plan may look like there. The 3GPP defined mechanism for this roaming model is interaction from P-CSCF to PCRF of the HPLM over the Rx interface to retrieve the MNC and the MCC of the VPLMN when user may be roaming and create the necessary SIP level information toward other IMS nodes indicating the roaming status and VPMN information of the subscriber. If the same MNC and MCC is shared among several factories/enterprises, the HPMN Mobile Network Operator (MNO) will not be able to distinguish the difference to enable different policy settings and also the charging records will not contain any unique identifier. This is further described in 3GPP TS 23.228, Annex W.

In the LBO model, where the P-CSCF may be understood to be in the visited network, the provision of IMS during roaming may be understood to be to find the correct home network. The mechanism to find home network may be understood to be based on MCC+MNC and since many enterprises may share the same MCC+MNC, an additional extension may be needed. For example, for LBO, the UE may send a SIP Register message to the network, e.g., VPMN P-CSCF, which may need to be routed to the Home IMS network. The SIP register may include a Request-Uniform Resource Identifier (URI) which may be generated by the UE considering its IMSI and generate a domain name per 3GPP TS 23.003. The domain name may only consider MNC and MCC. This may be understood to mean that the domain names generated by an UEs of the factory and/or enterprises sharing a same MNC and MCC, may not be able to be distinguished, in order to route IMS traffic, e.g., to set up a call, to the correct home network IMS.

In view of the foregoing, it is an object of embodiments herein to improve the handling of an identification of a communications network from another network.

According to a first aspect of embodiments herein, the object is achieved by a method, performed by a first node. The first node manages a Proxy-Call Session Control Function in a first communications network. The method may be understood to be for handling identification of a second communications network. One of the first communications network and the second communications network is a home network and the other of the first communications network and the second communications network is a visited network. The first node obtains a unique identifier. The unique identifier uniquely identifies the second communications network in a plurality of communications networks sharing a Mobile Network identifier. The unique identifier is based on: a) an MCC, and an MNC, corresponding to a shared PLMN identifier, and b) a subscriber identifier corresponding to the second communications network. The first node also processes provision of an IMS service across the first communications network and the second communications network, to a device operating in the visited network. The processing is based on the obtained identifier. The processing comprises, in the home network, one of: i) application of a policy or rule, and ii) routing a communication to a S-CSCF.

According to a second aspect of embodiments herein, the object is achieved by a method, performed by a second node. The method may be understood to be is for handling identification of the second communications network. The second node operates in one of the first communications network and the second communications network. One of the first communications network and the second communications network is the home network and the other of the first communications network and the second communications network is the visited network. The second node receives an indication of the unique identifier. The unique identifier uniquely identifies the second communications network in the plurality of communications networks sharing the Mobile Network identifier. The unique identifier is based on a) the MCC, and the MNC, corresponding to the shared PLMN identifier, and b) the subscriber identifier corresponding to the second communications network. The second node also processes provision of the IMS service across the first communications network and the second communications network, to is device operating in the visited network. The processing is based on the received identifier.

According to a third aspect of embodiments herein, the object is achieved by the first node. The first node is configured to manage the P-CSCF in the first communications network. The first node may be considered to be for handling identification of the second communications network. One of the first communications network and the second communications network is configured to be the home network and the other of the first communications network and the second communications network is configured to be the visited network. The first node is further configured to obtain is unique identifier. The unique identifier is configured to uniquely identify the second communications network in the plurality of communications networks configured to share the Mobile Network identifier. The unique identifier is configured to be based on: a) the MCC and the MNC configured to correspond to a shared PLMN identifier, and b) the subscriber identifier configured to correspond to the second communications network. The first node is further configured to process provision of the IMS service across the first communications network and the second communications network, to the device configured to operate in the visited network. The processing is configured to be based on the identifier configured to be obtained. The processing comprises, in the home network, one of: i) application of a policy or rule, and ii) routing a communication to an S-CSCF.

According to a fourth aspect of embodiments herein, the object is achieved by the second node. The second node may be understood to be for handling identification of the second communications network. The second node is configured to operate in one of the first communications network and the second communications network. One of the first communications network and the second communications network is configured to be the home network and the other of the first communications network 101 and the second communications network is configured to be the visited network. The second node is further configured to receive the indication of the unique identifier. The unique identifier is configured to uniquely identify the second communications network in the plurality of communications networks sharing the Mobile Network identifier. The unique identifier is configured to be based on: a) the MCC and the MNC corresponding to the shared Public Land Mobile Network identifier, and b) the subscriber identifier corresponding to the second communications network. The second node is further configured process provision of the IMS service across the first communications network and the second communications network, to the device configured to operate in the visited network. The processing is configured to be based on the identifier configured to be received.

By obtaining the unique identifier, the first node may be enabled to identify the second communications network, out of the plurality of communications networks sharing the same Mobile Network identifier, and thereby enabled to apply whichever rule or policy may correspond to the device, or route a communication to a Serving-Call Session Control Function (S-CSCF), in order to provide IMS to the device.

By processing the provision of the IMS service to the device based on the obtained identifier, the first node may be enabled to appropriately apply whichever rule or policy which may correspond to the device, or route a communication to the S-CSCF which may correspond to the device, in order to provide IMS to the device.

By obtaining the indication from the first node, the second node may be enabled to, based on the obtained identifier, identify the second communications network, out of the plurality of communications networks sharing the same Mobile Network identifier, and thereby adequately provision the IMS service to the device. This may be for example, obtaining the subscriber profile corresponding to the device from the correct HSS at the time of registration, in order to, for example, determine which Application Server any service requests may need to be sent to in order to enable routing of SIP messages as part of service establishment procedures.

BRIEF DESCRIPTION OF THE DRAWINGS

Examples of embodiments herein are described in more detail with reference to the accompanying drawings, and according to the following description.

FIG. 14 is a flowchart depicting embodiments of a method in a communications system including a host computer, a base station and a user equipment, according to embodiments herein.

FIG. 15 is a flowchart depicting embodiments of a method in a communications system including a host computer, a base station and a user equipment, according to embodiments herein.

FIG. 16 is a flowchart depicting embodiments of a method in a communications system including a host computer, a base station and a user equipment, according to embodiments herein.

FIG. 17 is a flowchart depicting embodiments of a method in a communications system including a host computer, a base station and a user equipment, according to embodiments herein.

DETAILED DESCRIPTION

Certain aspects of the present disclosure and their embodiments may provide solutions to these challenges or other challenges. There are, proposed herein, various embodiments which address one or more of the issues disclosed herein.

As a brief overview, embodiments herein may be understood to relate to IMS roaming support using a shared PLMN.

Embodiments herein may be understood to relate to adding additional identifiers in the network to enable IMS roaming for MCC+MNC combinations that cannot be uniquely identified alone.

In general, embodiments herein may therefore be understood to be related to IMS, Roaming, Shared HNI, SHNI, Shared PLMNid, NPN, SNPN, 5G, and 4G.

Some of the embodiments contemplated will now be described more fully hereinafter with reference to the accompanying drawings, in which examples are shown. In this section, the embodiments herein will be illustrated in more detail by a number of exemplary embodiments. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Note that although terminology from LTE/5G has been used in this disclosure to exemplify the embodiments herein, this should not be seen as limiting the scope of the embodiments herein to only the aforementioned system. Other wireless systems with similar features, may also benefit from exploiting the ideas covered within this disclosure.

Figure 1:
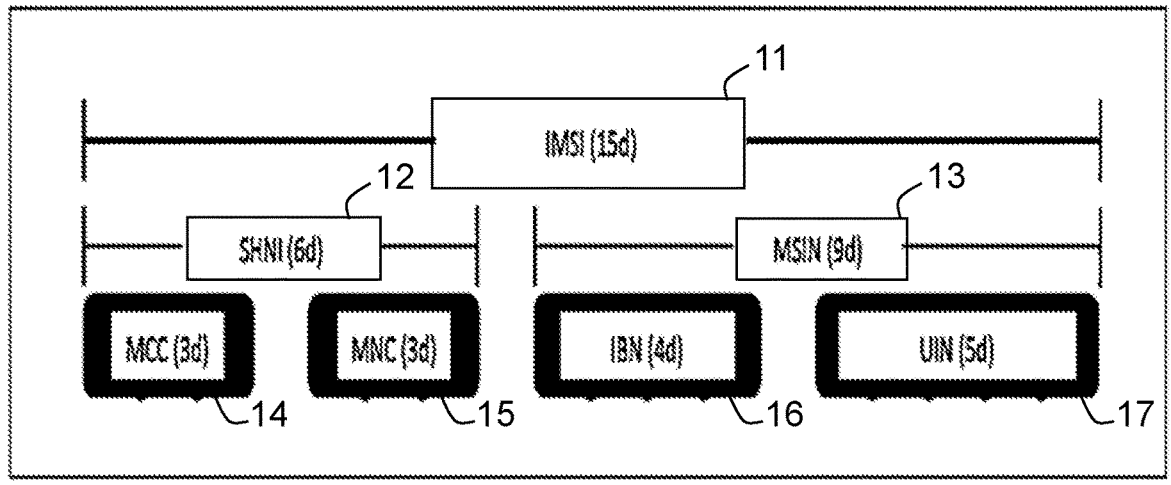
FIG. 1 is a schematic diagram illustrating an example of an IMSI Block number plan when using shared HNI, according to existing methods.
Figure 2:
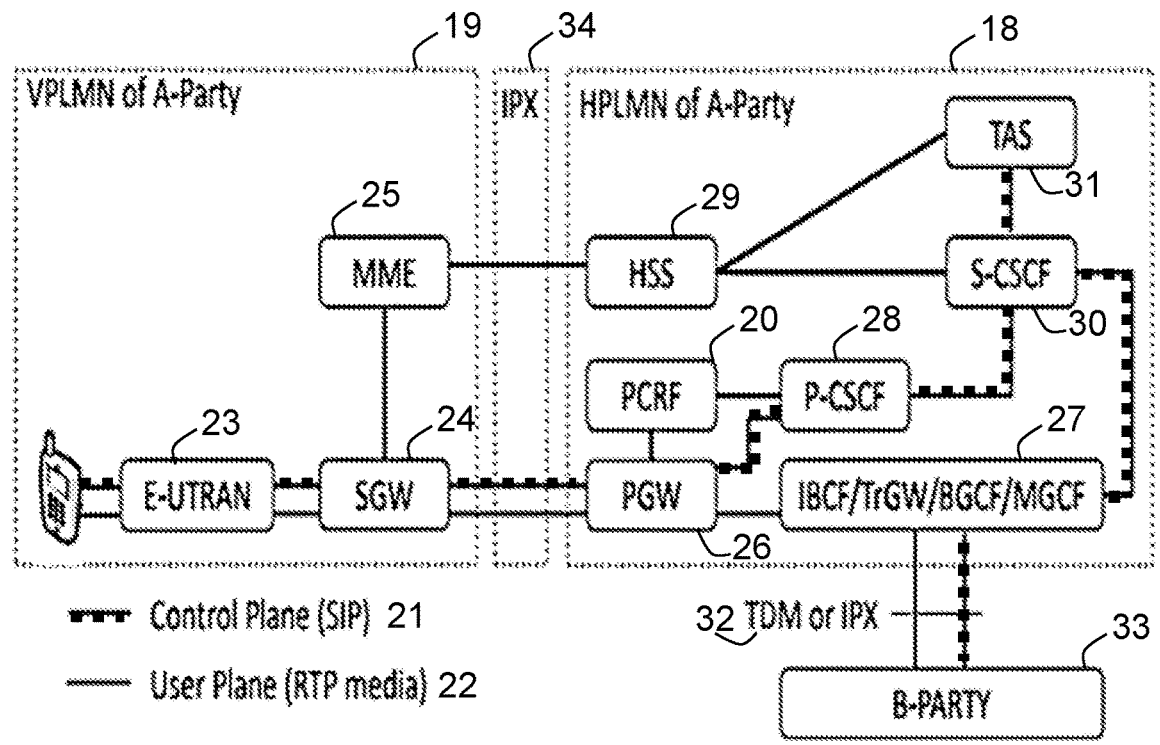
FIG. 2 is a schematic diagram illustrating an example of an S8HR Roaming architecture as per the Global System for Mobile communications Association (GSMA), according to existing methods.
Figure 3:
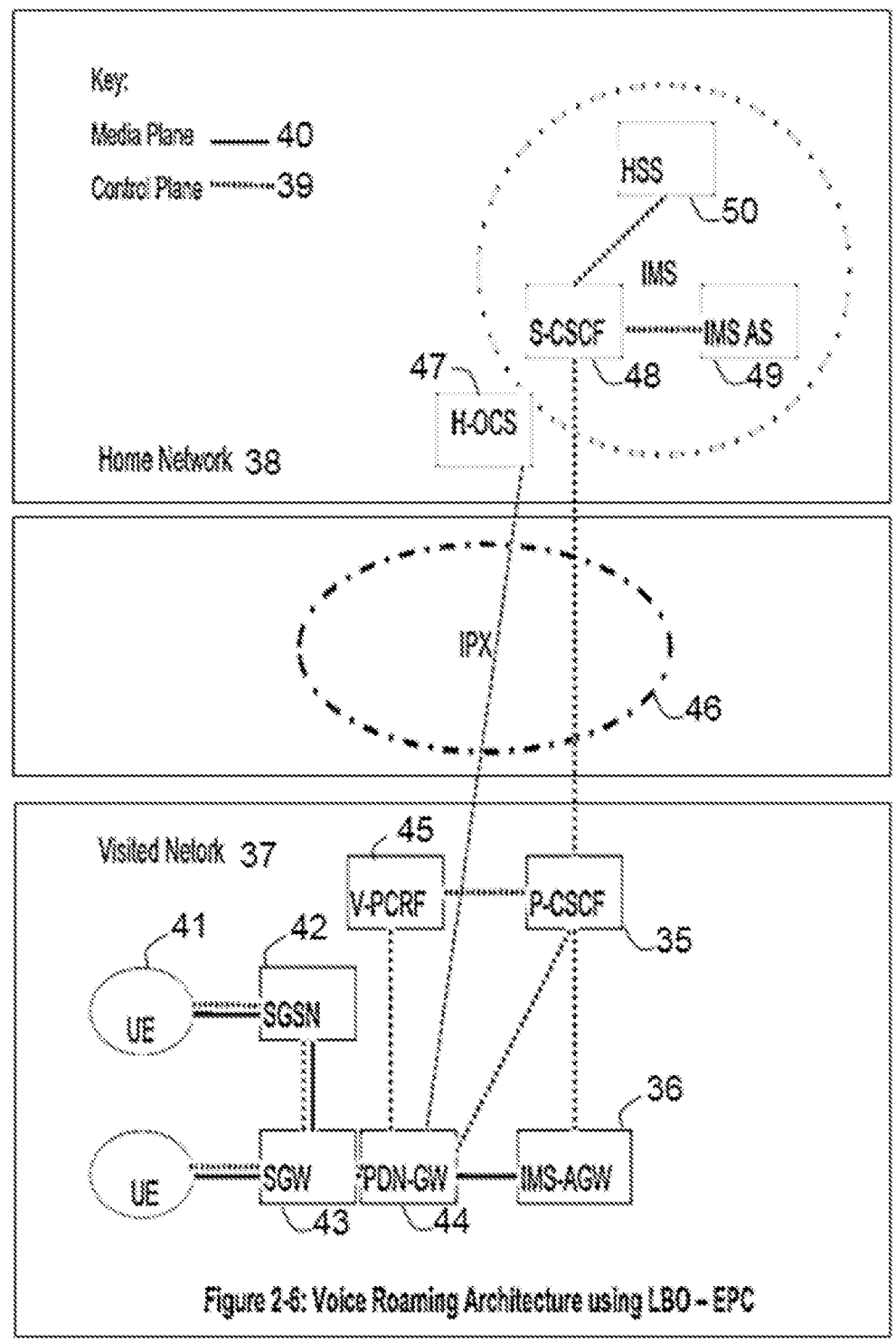
FIG. 3 is a schematic diagram illustrating an example of an LBO Roaming architecture as per GSMA, according to existing methods.
Figure 4:
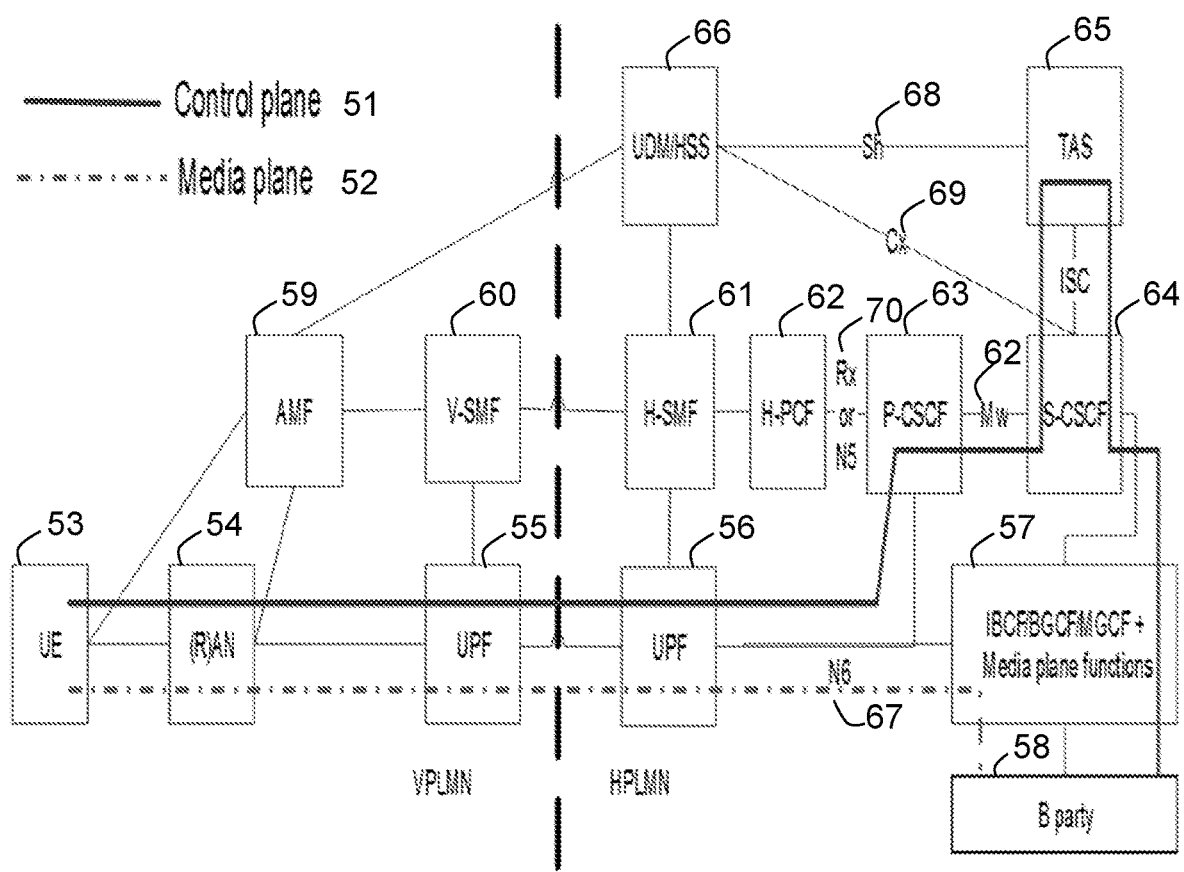
FIG. 4 is a schematic diagram illustrating an example of a Home routed IMS in 5GC, according to existing methods.
Figure 5:
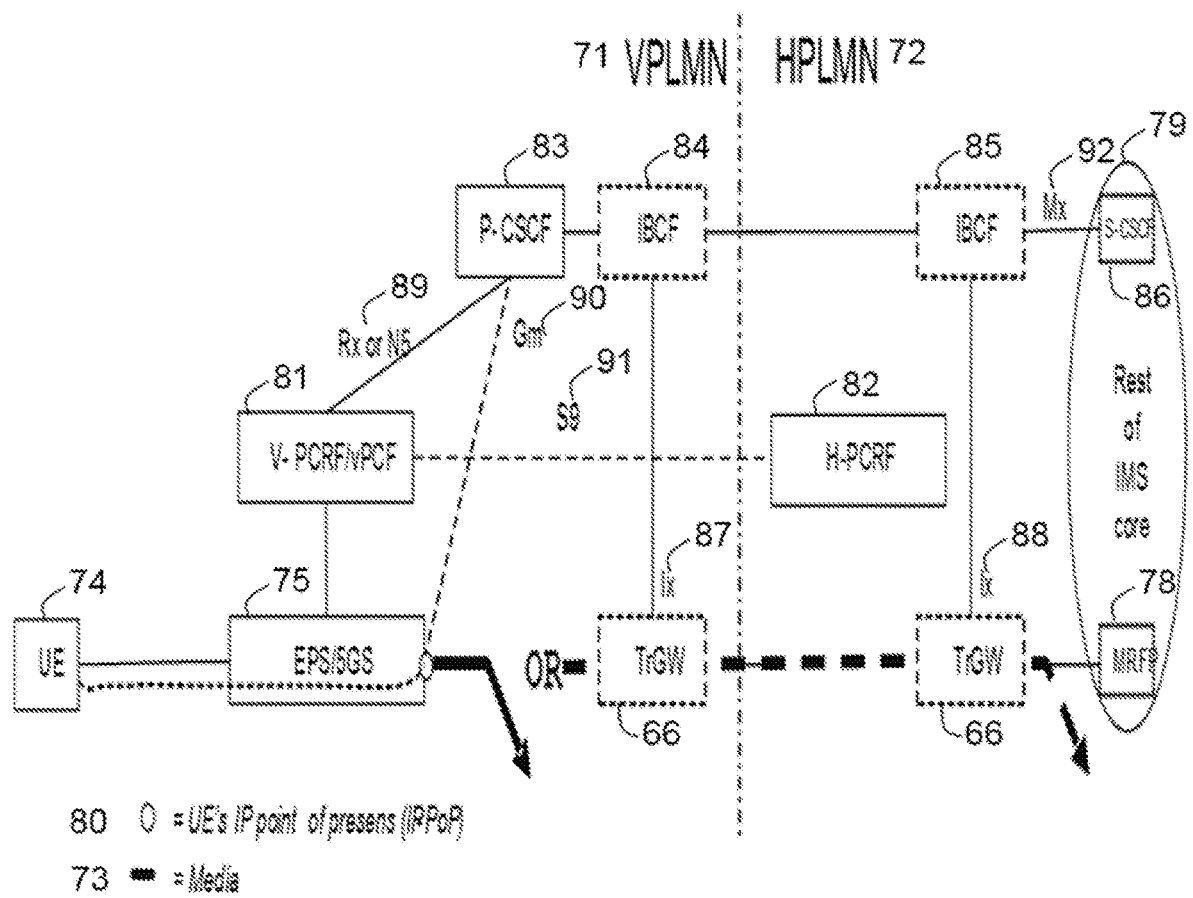
FIG. 5 is a schematic diagram illustrating an example of an EPS/5GS architecture for IMS Local Breakout with the P-CSCF located in the visited network, according to existing methods.
Figure 6:
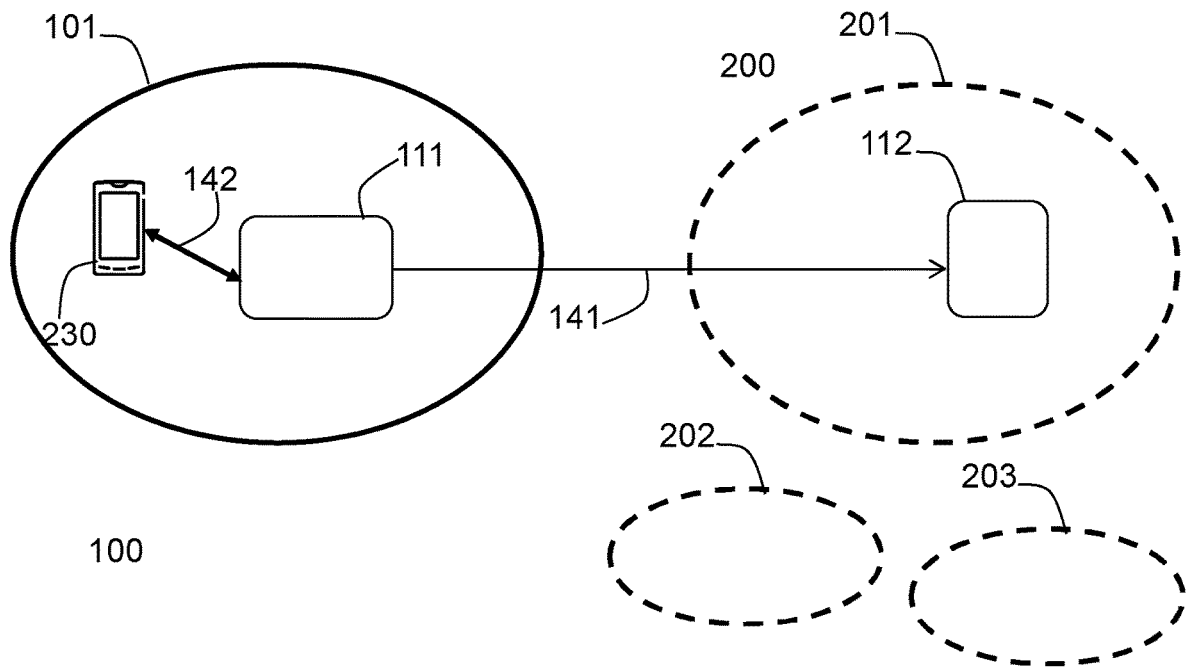
FIG. 6 is a schematic diagram illustrating a communications network, according to embodiments herein.
Figure 6:
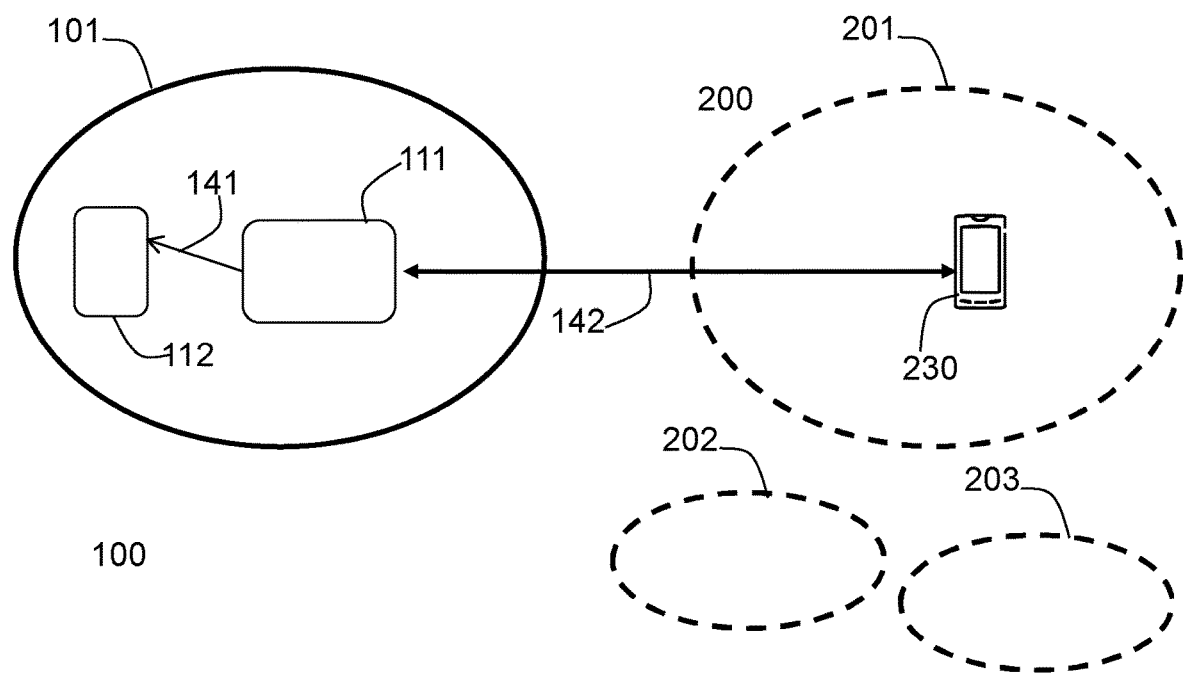

FIG. 6 depicts two non-limiting examples, in panel a) and panel b), respectively, of a system of communications networks 100, in which embodiments herein may be implemented. The system of communications networks 100 comprises a first communications network 101 and a plurality of communications networks 200, that is a plurality of other communications network 200. The plurality of communications networks 200 comprises a second communications network 201. The plurality of communications networks 200 may comprise one or more additional communications networks. In the non-limiting examples of FIG. 6, the plurality of communications networks 200 comprises, in addition to the second communications network 201, a third communications network 202, and a fourth communications network 203. However, it may be understood that the plurality of communications networks 200 may comprise more or less communications networks, and that the number depicted in FIG. 6 is non-limiting.

Any of the first communications network 101 and the communications networks comprised in the plurality of communications networks 200 may be sometimes also referred to as a cellular radio system, cellular network or wireless communications system. Any of the first communications network 101 and the communications networks comprised in the plurality of communications networks 200 may for example be a network such as 5G system, or Next Gen network, or a newer system supporting similar functionality. In some examples, any of the first communications network 101 and the communications networks comprised in the plurality of communications networks 200 may be a non-cellular system, comprising network nodes which may serve receiving nodes, such as wireless devices, with serving beams. This may be a typical case in a 5G network using New Radio (NR), or a younger system with similar functionality. Any of the first communications network 101 and the second communications network 201 may also support other technologies, such as a Long-Term Evolution (LTE) network, e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), UTRA TDD, Global System for Mobile communications (GSM) network, GSM/Enhanced Data Rate for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, Wireless Local Area Network/s (WLAN) or WiFi network/s, Worldwide Interoperability for Microwave Access (WiMax), IEEE 802.15.4-based low-power short-range networks such as 6LowPAN, Bluetooth, or any cellular network or system.

Although terminology from Long Term Evolution (LTE)/5G has been used in this disclosure to exemplify the embodiments herein, this should not be seen as limiting the scope of the embodiments herein to only the aforementioned system. Other wireless systems, support similar or equivalent functionality may also benefit from exploiting the ideas covered within this disclosure. In future radio access, e.g., in the sixth generation (6G), the terms used herein may need to be reinterpreted in view of possible terminology changes in future radio access technologies.

One of the first communications network 101 and the second communications network 201 is a home network and the other of the first communications network 101 and the second communications network 201 is a visited network. In some particular examples, the first communications network 101 may be an HPLMN and the second communications network 201 may be a VPLMN. In other examples, the first communications network 101 may be a VPLMN and the second communications network 201 may be a HPLMN. Each of the first communications network 101 and the second communications network 201 may be operated by a respective operator. In some particular examples, such as that depicted in panel a), the first communications network 101 may be an VPLMN and the second communications network 201 may be a HPLMN. In other examples, such as that depicted in panel b), the first communications network 101 may be a HPLMN and the second communications network 201 may be a VPLMN.

The system of communications networks 100 may comprise a plurality of nodes, whereof a first node 111, and a second node 112 are depicted in FIG. 6. The first node 111 operates in the first communications network 101. The second node 112 may operate in one of the first communications network 101, as depicted in the non-limiting example of FIG. 6b), and another communications network, such as, as depicted in the non-limiting example of panel a) in FIG. 6, the second communications network 201. Any of the first node 111 and the second node 112 may be understood, respectively, as a first computer system, and a second computer system. In some examples, any of the first node 111, and the second node 112 may be implemented as a standalone server in e.g., a host computer in the cloud. Any of the first node 111 and the second node 112 may in some examples be a distributed node or distributed server, with some of their respective functions being implemented locally, e.g., by a client manager, and some of its functions implemented in the cloud, by e.g., a server manager. Yet in other examples, any of the first node 111 and the second node 112 may also be implemented as processing resources in a server farm.

Any of the first node 111 and the second node 112 may be co-located, or be the same node. In typical examples, however, the first node 111 and the second node 112 are different nodes. All the possible combinations are not depicted in FIG. 6 to simplify FIG. 6.

In some examples of embodiments herein, the first node 111 may be a node capable of managing a Proxy-Call Session Control Function (P-CSCF) in the first communications network 101.

The second node 112 may, in some examples, be, for example, managing a Serving-Call Session Control Function in the first communications network 101. In other examples, the second node 112, may be for example, a Telecommunication Application Server (TAS), or e.g., an IMS-AGW, a PDN-GW, a V-PCRF, a UPF, an H-PCF, an IBCF/BGCF/MGCF, a node managing a Media Plane Function, an IBCF, a vPCF, an EPS/5GS node, a Network Data Analytics Function (NWDAF), a Mobility Management Entity (MME), Access Management Function (AMF), Session Management Function (SMF), Service GW node (SGVV), Packet data GW node (PGVV), Self-Organizing Network (SON) node, Operation Support System node (OSS), a Home Subscriber Server (HSS), a Home Location Register (HLR), or a Business support system (BSS).

The system of communications networks 100 may be understood to comprise, in other examples not depicted in FIG. 6, one or more additional nodes. Any of the first node 111, and the second node 112 may be a core network node, of a core network.

The first communications network 101 may comprise one or more devices, of which a device 230 is represented in FIG. 6. The device 230 may be also known as e.g., a UE, mobile terminal, wireless terminal and/or mobile station, mobile telephone, cellular telephone, or laptop with wireless capability, or a Customer Premises Equipment (CPE), just to mention some further examples. The device 230 in the present context may be, for example, portable, pocket-storable, hand-held, computer-comprised, or a vehicle-mounted mobile device, enabled to communicate voice and/or data, via a RAN, with another entity, such as a server, a laptop, a Personal Digital Assistant (PDA), or a tablet computer, sometimes referred to as a tablet with wireless capability, or simply tablet, a Machine-to-Machine (M2M) device, a device equipped with a wireless interface, such as a printer or a file storage device, modem, Laptop Embedded Equipped (LEE), Laptop Mounted Equipment (LME), USB dongles, or any other radio network unit capable of communicating over a link in the first communications network 101 and/or the second communications network 201. The device 230 may be wireless, i.e., it may be enabled to communicate wirelessly in the first communications network 101 or in the second communications network 201 and, in some particular examples, may be able support beamforming transmission. The communication may be performed e.g., between two devices, between a device and a radio network node, and/or between a device and a server. The communication may be performed e.g., via a RAN and possibly one or more core networks, comprised, respectively, within the first communications network 101 and the second communications network 201.

The system of communications networks 100 may comprise a plurality of radio network nodes, which are not depicted in FIG. 6. Any of the radio network nodes may typically be a base station or Transmission Point (TP), or any other network unit capable to serve a wireless device or a machine type node in the first communications network 101, and second communications network 201, respectively. Any of the radio network nodes may be e.g., a 3G Node B (NB), a 4G eNB, a 5G gNB. Each of the first radio network node 131 and the second radio network node 132 may be e.g., a Wide Area Base Station, Medium Range Base Station, Local Area Base Station and Home Base Station, based on transmission power and thereby also coverage size. Any of the radio network nodes may be e.g., a gNB, a 4G eNB, or a 5G or alternative 5G radio access technology node, e.g., fixed or WiFi. Any of the radio network nodes may be a stationary relay node or a mobile relay node. Any of the radio network nodes may support one or several communication technologies, and its name may depend on the technology and terminology used. Any of the radio network nodes may be directly connected to one or more networks and/or one or more core networks.

Any of the radio network nodes may cover a geographical area which may be divided into cell areas, wherein each cell area may be served by a radio network node, although, one radio network node may serve one or several cells.

The first node 111 may communicate with the second node 112 over a first link 141, e.g., a radio link or a wired link. The first node 111 may communicate with the device 230 over a second link 142, e.g., a radio link or a wired link. Any of the first link 141, and the second link 142, may be a direct link or comprise one or more links, e.g., via one or more other network nodes, radio network nodes or core network nodes.

Any of the first link 141, and the second link 142 may be a direct link or it may go via one or more computer systems or one or more core networks in the first communications network 101 or the second communications network 201, or it may go via an optional intermediate network. The intermediate network may be one of, or a combination of more than one of, a public, private or hosted network; the intermediate network, if any, may be a backbone network or the Internet; in particular, the intermediate network may comprise two or more sub-networks, which is not shown in FIG. 6.

In general, the usage of "first", "second", "third", and/or "fourth" herein may be understood to be an arbitrary way to denote different elements or entities, and may be understood to not confer a cumulative or chronological character to the nouns they modify.

Generally, all terms used herein are to be interpreted according to their ordinary meaning in the relevant technical field, unless a different meaning is clearly given and/or is implied from the context in which it is used. All references to a/an/the element, apparatus, component, means, step, etc.

are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments.

More specifically, the following are embodiments related to a first node, such as the first node 111, e.g., a P-CSCF node, and embodiments related to a second node, such as the second node 112, e.g., a S-CSCF.

Figure 7:
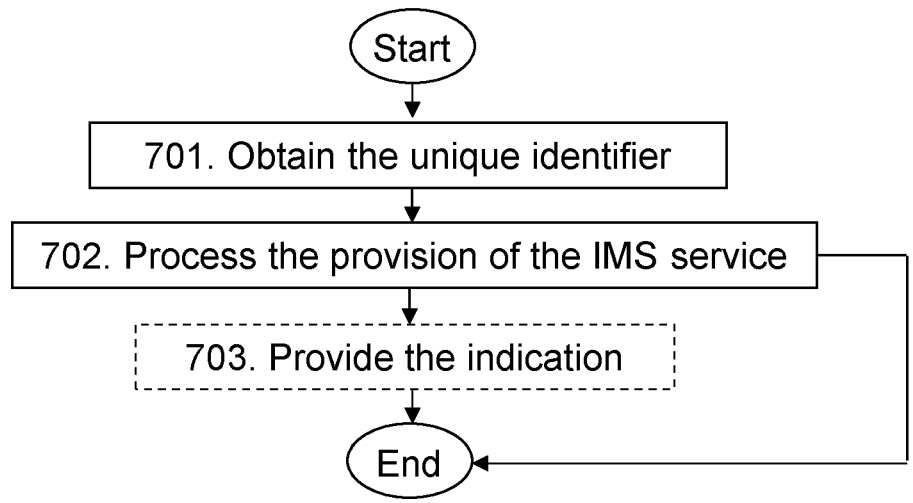
FIG. 7 depicts a flowchart of a method in a first node, according to embodiments herein.

Embodiments of a method, performed by the first node 111, will now be described with reference to the flowchart depicted in FIG. 7. The first node 111 manages a Proxy-Call Session Control Function, P-CSCF, in the first communications network 101. The method may be understood to be for handling identification of the second communications network 201. One of the first communications network 101 and the second communications network 201 is a home network and the other of the first communications network 101 and the second communications network 201 is a visited network. In some embodiments, at least one of the first communications network 101 and the second communications network 201 may be a Fifth Generation (5G) network or a Long Term Evolution (LTE) network.

In particular examples, the first communications network 101 may be a visited network, e.g., a VPMN.

Several embodiments are comprised herein. In some embodiments all the actions may be performed. In other embodiments, one or more actions may be performed. One or more embodiments may be combined, where applicable. All possible combinations are not described to simplify the description. It should be noted that the examples herein are not mutually exclusive. Components from one embodiment may be tacitly assumed to be present in another embodiment and it will be obvious to a person skilled in the art how those components may be used in the other exemplary embodiments. A non-limiting example of the method performed by the first node 111 is depicted in FIG. 7. In FIG. 7, actions which may be optional in some examples are depicted with dashed boxes.

Action 701

In the course of operations of the communications network 100, the device 230 may roam, from its home network to a visited network. In some cases, either the home network or the visited network may be comprised in the plurality of communications networks 200, which may share a common identifier. For example, the plurality of communications networks 200 may be plurality of enterprises or factories sharing the same MCC and MNC. In order to, for example, provide IMS services to the roaming device 230, the exact communications network where the device 230 may be roaming in, as visited network, or roaming from, as home network, may need to be uniquely identified in order to adequately process the provision of IMS services to the device 230. An IMS service may be understood as a service provided to a subscriber by IMS or to an operator for the subscriber. This may be related to number and dial plans, Lawful intercept, Supplementary Services and specially barring relate services when a subscriber may be roaming etc. . . . . .

Whether the communications network sharing the common identifier may be the home network or the visited network may become relevant based on, for example, the kind of roaming the device 230 may be using. As explained above, in the Home routed model for IMS roaming, where the IMS functions may be understood to be in the Home network, it may be necessary to distinguish among different VPLMNs where the device 230 may be roaming into, since many VPLMNs may share the same MCC+MNC. Since the Home network cannot distinguish these as they have same MCC+MNC, an additional identifier may be needed in the Home network in order to identify different visited networks sharing the same MCC+MNC.

In the LBO model, where the first node 111 may be understood to be in the visited network, for the provision of IMS during roaming the correct home network may need to be identified. Since the existing mechanism to find home network may be understood to be based on MCC+MNC and since many enterprises may share the same MCC+MNC, an additional extension may be needed.

In agreement with the foregoing, the first node 111 may be comprised in some embodiments, in the visited network, and in other embodiments, in the home network.

To facilitate the provision of IMS to the device 230 while roaming in accordance to the foregoing, in this Action 701, the first node 111 may obtain a unique identifier. The unique identifier uniquely identifies the second communications network 201 in the plurality of communications networks 200 sharing a Mobile Network identifier. The unique identifier is based on: a) a Mobile Country Code (MCC), and a Mobile Network Code (MNC), corresponding to a shared Public Land Mobile Network identifier, and b) a subscriber identifier corresponding to the second communications network 201.

Obtaining may be understood as generating, determining, calculating, deriving, or receiving from another node in the system of communications networks 100. Obtaining may also comprise retrieving from a memory.

In some embodiments, the subscriber identifier may be an International Mobile Subscriber Identity (IMSI) Series or an IMSI Block Number (IBN) corresponding to the second communications network 201. In other examples, the subscriber identifier may be an IMS Private User Identity (IMPI). That is, in some embodiments, the subscriber may be understood to be an individual.

In other embodiments, the subscriber identifier may be an Internet Assigned Numbers Authority (IANA), organization identity or a Network Access Identifier (NAI) corresponding to the second communications network 201. That is, in other embodiments, the subscriber may be understood to be an organization, e.g., a factory or an enterprise.

In some embodiments, the obtaining in this Action 701 may be performed prior to generating Session Initiation Protocol (SIP) signalling towards a) an Internet Protocol Multimedia Subsystem (IMS) core in the first communications network 101 or b) an Application Server in the first communications network 101.

In some embodiments, the first communications network 101 may comprise a Home Routed Roaming Architecture, e.g., an S8HR architecture. Particular examples of each of these embodiments are described next.

S8HR and Normal MNO Subscriber Roaming in the Factory/NPN Network:

To enable Home Public Mobile Network (HPMN) IMS, that is, the normal, that is, current, MNO HPMN, to distinguish between different factories and/or enterprises sharing a same MNC and MCC, and before the first node 111, e.g., the P-CSCF, may generate SIP signaling towards the IMS Core, additional information may need to be considered.

Figure 9:
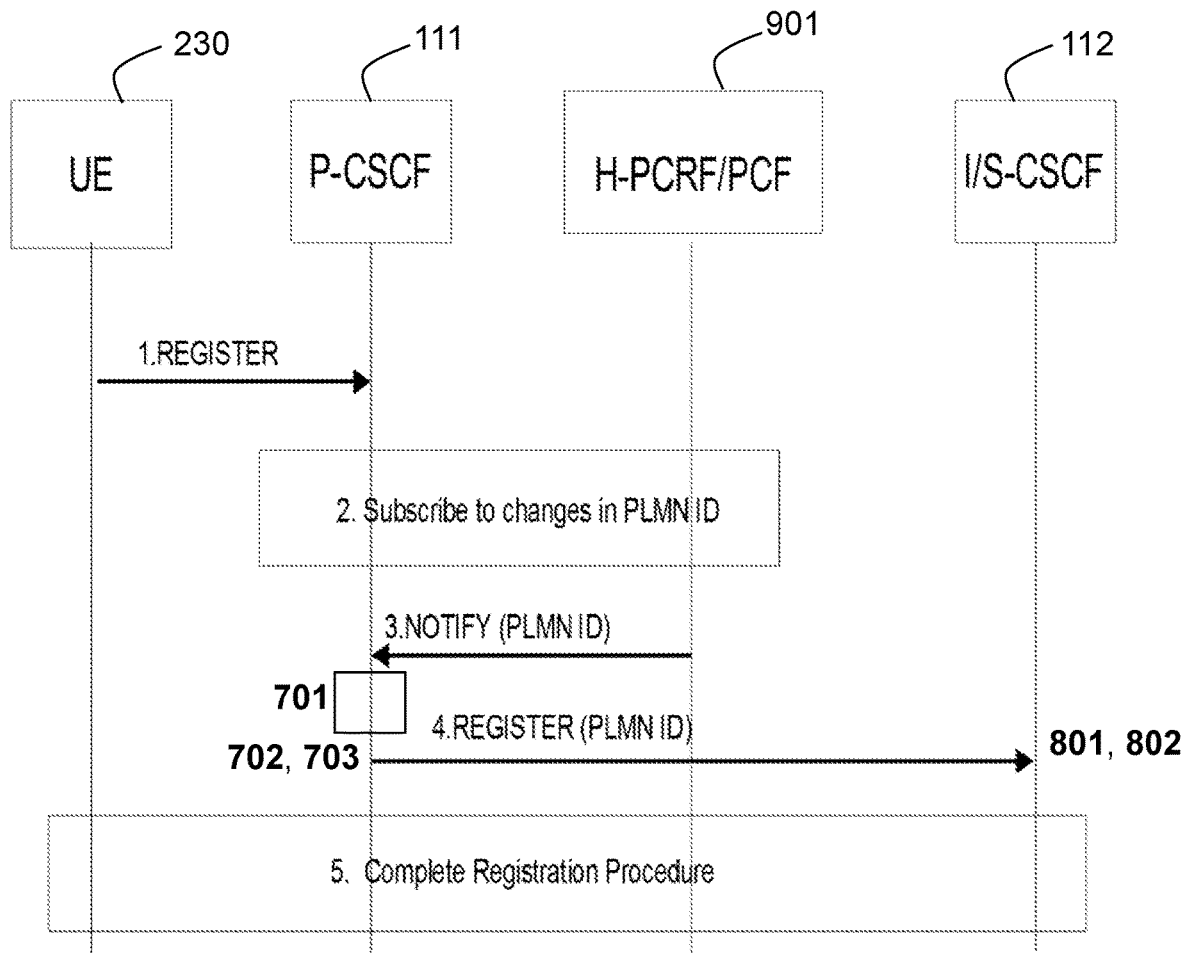
FIG. 9 is a schematic diagram illustrating an example of a method in a system of communications networks, according to embodiments herein.

This may be based on configuration of different IMSI series for different factories and/or enterprises, and besides the MNC/MCC that may be received in this Action 701, and also e.g., in step 3 of FIG. 9, from 3GPP TS 23.228, Annex W, embodiments may also consider the IMSI series or IMSI Block Numbers (IBN), e.g., as provided by ATIS IOC. It may be noted that while IMSI may not generally be used in IMS but IMPI may be. IMPI may be generated based on the IMSI, e.g., by the device. One possible solution may be to configure the IMSI series or IBN for different factories and/or enterprises in the P-CSCF, and also consider it when generating a P-Visited-Network-Identifier (PVNI). This may be, for example, to add a pre-configured addition to a defined PVNI in GSMA PRD IR.65, that is, s8 hr.ims.npn-id.mnc<MNC>.mcc<MCC>0.3gppnetwork.org.

Note that this SIP header, that is, the PVNI, may need to be provided in additional SIP signaling e.g., during call setup from the first node 111, e.g., the P-CSCF, to IMS Core and Application Servers also.

These embodiments may be understood to be based on a simple configuration, and assuming a bilateral agreement to exchange information that may be necessary between the parties, e.g., the respective operators of the first communications network 101 and the second communications network 201. Other models may be possible to make the solution more "automatic" but will be more complicated. For example, additional information about the factory and/or enterprise identity, e.g. IMSI or IBN may be provided, e.g., by the MME via SGW to the home PDN-GW and further via PCRF to IMS in this Action 701, and also e.g., in step 3 of FIG. 9 for IMS to use when constructing a PVNI. FIG. 9 will be described later.

As this may be also applicable to 5GS and 5GC/NR roaming, since a model based on configuration may not impact the interaction with 5GC, the solution based on the interaction with 5GC may imply that the first node 111, e.g., the P-CSCF, may retrieve the information over Rx interface from the PCF, see 23.501 for 5GC architecture. The PCF may in turn need to retrieve the information from a SMF/PDN Gateway (PGW-C) over N7 and over N16 from a V-SMF and an AMF.

In another embodiment, the solution may use NPN defined identities to perform the identification of the Visited Network, e.g., IANA org identity or Network Access Identifier (NAI). In such scenario, the identity may be provided by the 3GPP defined 5GC entities.

Roaming of NPN users to other NPN networks or Public PLMN may also use the NPN defined identities e.g., IANA org or NAI to identify Home as well as Visited Network.

In other embodiments, the first communications network 101 may comprise a Local BreakOut (LBO) architecture. Particular examples of each of these embodiments are described next.

IMS LBO Roaming and Factory/Enterprise Subscriber Roaming in Normal MNO:

For the LBO roaming and routing of SIP register to Home, that is, the factory and/or enterprise, as the UE may generate the home domain name, based on 3GPP TS 23.003, using the MNC and MCC from IMSI, the problem may be understood to be that it may be the same home domain name for multiple networks. For the first node 111, e.g., a P-CSCF and IBCF in the VPMN to be able to route the SIP register to the correct HPMN, additional differentiation may be needed. One solution may be again that the first node 111, e.g., the VPMN P-CSCF may use the IMPI, and IMSI portion of it and a local configuration to map the domain name to a unique domain name for the specific factory and/or enterprise. Such domain name for each of these factories and/or enterprises may be needed anyway as the factory and/or enterprise and their subscribers may need to be reachable over the IMS Network to Network Interface (NNI), interconnect between different operators, which may be understood to also be a domain name constructed based on MNC and MCC of the operator—See GSMA PRD IR.67, "ims.mnc<MNC>.mcc<MCC>0.3gppnetwork.org".

As one example, the above, that is, ims.mnc<MNC>.mcc<MCC>0.3gppnetwork.org, may be amended with the enterprise and/or factory e.g.: <factory>.ims.mnc<MNC>.mcc<MCC>0.3gppnetwork.org.

By obtaining the unique identifier in this Action 701, the first node 111 may be enabled to identify the second communications network 201, out of the plurality of communications networks 200 sharing the same Mobile Network identifier, and thereby enabled to apply whichever rule or policy may correspond to the device 230, or route a communication to a Serving-Call Session Control Function (S-CSCF), in order to provide IMS to the device 230.

Action 702

In this Action 702, the first node 111 processes provision of an IMS service across the first communications network 101 and the second communications network 201, to the device 230 operating in the visited network. The processing in this Action 702 is based on the obtained identifier. The processing in this Action 702 comprises, in the home network, one of: i) application of a policy or rule, and b) routing a communication to a Serving-Call Session Control Function (S-CSCF), e.g., to the second node 112.

The IMS service may be based on a SIP, e.g., on SIP information or signalling.

In some embodiments, the processing in this Action 702 may comprise registering the device 230 roaming in the second communications network 201 as Visited Public Land Mobile Network (V-PLMN). In some of such embodiments, the obtained identifier may be a Private-Visited Network Identifier (PVNI).

In some embodiments, the first communications network 101 may comprise a Home Routed Roaming Architecture, e.g., an S8HR architecture. Some of such embodiments may be those described in the preceding paragraph.

In some embodiments, the processing in this Action 702 may comprise registering the device 230 roaming from the second communications network 201 as Home PLMN.

In some embodiments, the first communications network 101 may comprise a Local BreakOut (LBO) architecture. Some of such embodiments may be those described in the preceding paragraph.

By processing the provision of the IMS service to the device 230 based on the obtained identifier in this Action 702, the first node 111 may be enabled to appropriately apply whichever rule or policy which may correspond to the device 230, or route a communication to the S-CSCF which may correspond to the device 230, in order to provide IMS to the device 230.

Action 703

In this Action 703, the first node 111 may provide an indication of the obtained unique identifier to the second node 112 in one of the first communications network 101 and the second communications network 201.

The providing, e.g., sending, may be performed, e.g., via the first link 141.

The first node 111 may be a P-CSCF in 5G.

The second node 112 may be an S-CSCF in 5G.

In some examples, the processing of Action 702 and the providing of Action 703 may be performed simultaneously, and/or as part of a same procedure or action.

The indication may be, for example, comprised in a SIP REGISTER request. The indication may be, for example, PVNI or PANI.

By providing the indication in this Action 703, the first node 111 may enable the second node 112 to, based on the received identifier, to identify the second communications network 201, out of the plurality of communications networks 200 sharing the same Mobile Network identifier, and thereby enable the second node 112 to adequately provision the IMS service to the device 230, e.g., obtaining the subscriber profile corresponding to the device 230 from the correct HSS at the time of registration, in order to, for example determine which Application Server any service requests may need to be sent to in order to enable routing of SIP messages as part of service establishment procedures.

Figure 8:
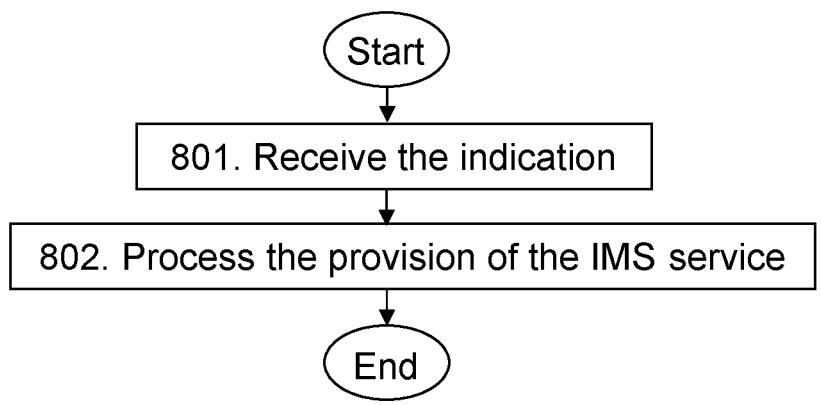
FIG. 8 depicts a flowchart of a method in a second node, according to embodiments herein.

Embodiments of a method, performed by the second node 112, will now be described with reference to the flowchart depicted in FIG. 8. The method may be understood to be for handling identification of the second communications network 201. The second node 112 operates in one of the first communications network 101 and the second communications network 201. As mentioned earlier, one of the first communications network 101 and the second communications network 201 is a home network and the other of the first communications network 101 and the second communications network 201 is a visited network.

In some embodiments, at least one of the first communications network 101 and the second communications network 201 may be a 5G network or an LTE network.

The method may comprise one or more of the following actions. Several embodiments are comprised herein. One or more embodiments may be combined, where applicable. It should be noted that the examples herein are not mutually exclusive. Components from one embodiment may be tacitly assumed to be present in another embodiment and it will be obvious to a person skilled in the art how those components may be used in the other. All possible combinations are not described to simplify the description. A non-limiting example of the method performed by the second node 112 is depicted in FIG. 8. The detailed description of some of the following corresponds to the same references provided above, in relation to the actions described for the first node 111 and will thus not be repeated here to simplify the description. For example, the IMS service may be based on a SIP, e.g., on SIP information or signalling.

Action 801

In this Action 801, the second node 112 receives the indication of the unique identifier. The unique identifier uniquely identifies the second communications network 201 in the plurality of communications networks 200 sharing the Mobile Network identifier. The unique identifier is based on: a) the MCC, and the MNC, corresponding to the shared Public Land Mobile Network identifier, and b) the subscriber identifier corresponding to the second communications network 201.

The receiving in this Action 801 may be implemented e.g., via the first link 141.

In some embodiments, the subscriber identifier may be the IMSI Series or the IBN corresponding to the second communications network 201. That is, in some embodiments, the subscriber may be understood to be an individual.

In some embodiments, the indicated identifier may be a PVNI.

In other embodiments, the subscriber identifier may be an Internet Assigned Numbers Authority (IANA), organization identity or a Network Access Identifier (NAI) corresponding to the second communications network 201. That is, in other embodiments, the subscriber may be understood to be an organization or an enterprise.

In some embodiments, the first communications network 101 may comprise a Home Routed Roaming Architecture.

In some embodiments, the first communications network 101 may comprise an LBO architecture.

In some embodiments, the receiving in this Action 801 may be performed prior to generating SIP signalling towards a) an Internet Protocol Multimedia Subsystem, IMS, core in the first communications network 101, or b) an Application Server in the first communications network 101.

The receiving in this Action 801 may be performed, e.g., via the first link 141.

The advantages of this Action 801 may be understood to be corresponding to those provided for Action 703.

Action 802

In this Action 802, the second node 112 processes provision of an IMS service across the first communications network 101 and the second communications network 201, to the device 230 operating in the visited network. The processing is based on the received identifier.

The processing in this Action 802 may for example comprise obtaining the subscriber profile corresponding to the device 230 from the correct HSS at the time of registration, in order to, for example determine which Application Server any service requests may need to be sent to in order to enable routing of SIP messages as part of service establishment procedures.

The advantages of this Action 802 may be understood to be corresponding to those described in Action 703.

EXAMPLES

Some embodiments herein will now be further described with some non-limiting examples. In the following description and that of examples of embodiments herein described earlier, any reference to a/the P-CSCF may be understood to equally refer the first node 111; any reference to a/the I/S-CSCF may be understood to equally refer the second node 112; any reference to a/the UE, and/or a/the "subscriber" or "MNO subscriber" may be understood to equally refer the device 230.

Reference may be made to the signalling diagram of FIG. 9. FIG. 9 depicts a non-limiting example of how the procedure described in 3GPP TS 23.228, Annex W may be adapted to implement embodiments herein. Particularly, FIG. 9 describes the signalling that may take place for the first node 111, a P-CSF, to subscribe with an H-PCRF or PCF 901, to changes in PLMN ID for the device 230, here a UE, during the IMS initial registration. In FIG. 9, the same reference numbers refer to elements/Actions described in any of FIGS. 6-8. The second node 112 in this example is an Interrogating (I)/S-CSCF. For this model, considering the call flow of FIG. 9, the first node 111, that is, the P-CSCF, may be in VPMN, that is, the first communications network 101, while IBCF/TrGW may be on the border of the VPMN and the HPMN, not shown in FIG. 9, and the rest of the IMS may be in the HPMN.

The above function in FIG. 9 may apply to the VPMN P-CSCF then. At step 1, the device 230 sends a SIP REGISTER request to the first node 111. At step 2, if this is an initial IMS registration, then the first node 111 subscribes to the H-PCRF or PCF 901 to be notified of the PLMN ID where the device 230 is currently attached. At step 3, the H-PCRF or PCF 901 forwards the PLMN ID to the first node 111. The first node 111 stores the PLMN ID. According to Action 701, the first node 111 may then obtain, e.g., determine the unique identifier. According to Action 702, the first node 111 may then process 702 provision an IMS service to the device 230, and based on the obtained identifier, send a SIP REGISTER request to the appropriate I-S-CSCF, identified according to the obtained unique identifier. According to Action 703, the first node 111 may simultaneously provide the obtained unique identifier in the SIP REGISTER before forwarding the request. At step 5, the IMS registration procedure is then completed.

Embodiments disclosed herein may be understood to provide the advantage of enabling support for IMS roaming in deployment scenarios that may encompass networks with no unique MCC+MNC combination, e.g. Shared PLMNid, Non-Public Networks, etc.

Figure 10:
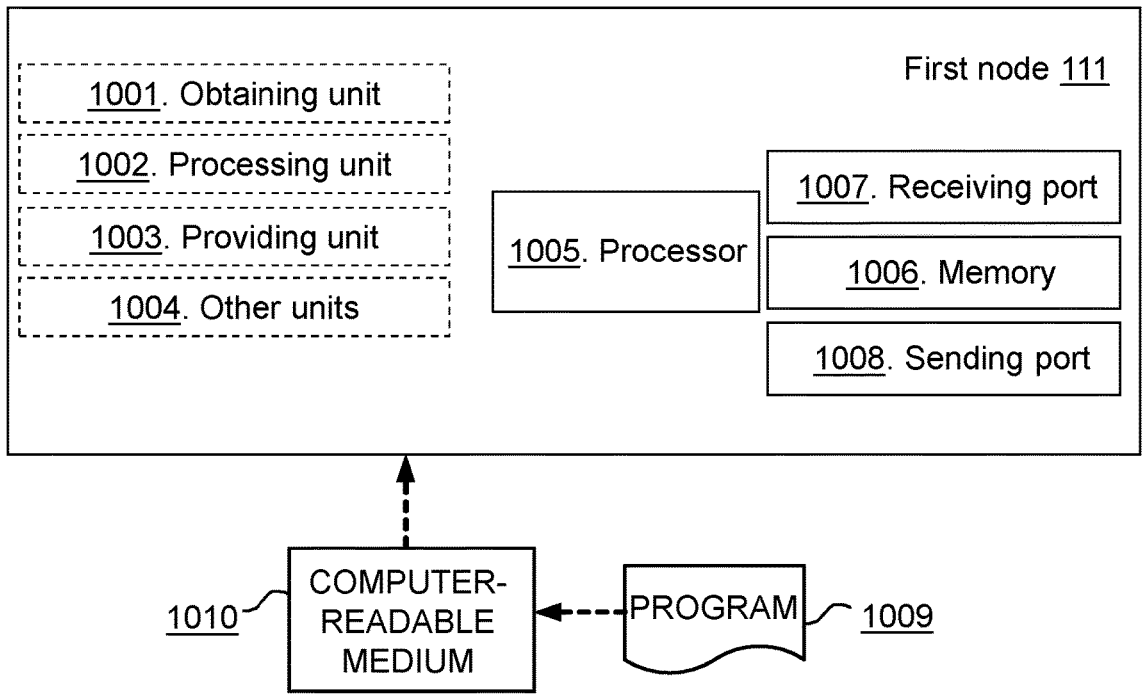
FIG. 10 is a schematic block diagram illustrating two non-limiting examples, a) and b), of a first node, according to embodiments herein.
Figure 10:
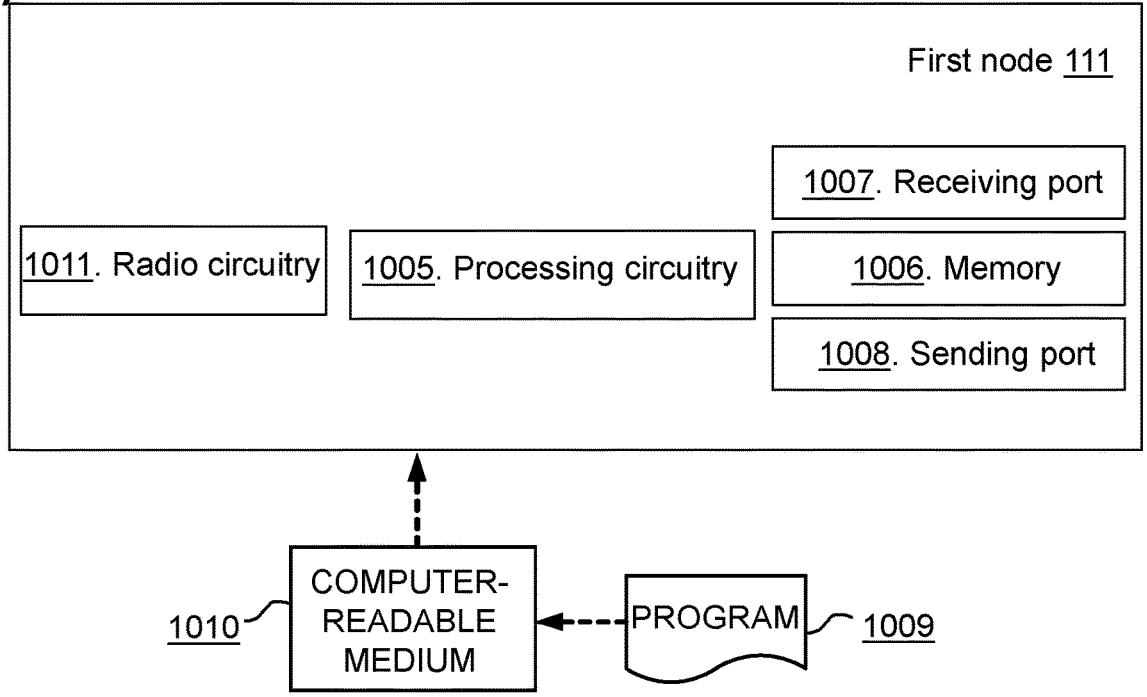

FIG. 10 depicts two different examples in panels a) and b), respectively, of the arrangement that the first node 111 may comprise. In some embodiments, the first node 111 may comprise the following arrangement depicted in FIG. 10a. The first node 111 is configured to manage a P-CSCF in a first communications network 101 The first node 111 may be understood to be for handling identification of a second communications network 201. One of the first communications network 101 and the second communications network 201 is configured to be the home network and the other of the first communications network 101 and the second communications network 201 is configured to be the visited network. Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the first network node 111 and will thus not be repeated here. For example, the IMS service may be based on a SIP, e.g., on SIP information or signalling.

In FIG. 10, optional units are indicated with dashed boxes.

The first node 111 is configured to perform the obtaining of Action 701, e.g. by means of an obtaining unit 1001 within the first node 111, configured to obtain the unique identifier. The unique identifier is configured to uniquely identify the second communications network 201 in the plurality of communications networks 200 configured to share the Mobile Network identifier. The unique identifier is configured to be based on: a) an MCC, and an MNC, configured to correspond to a shared PLMN identifier, and b) a subscriber identifier configured to correspond to the second communications network 201. The obtaining unit 1001 may be a processor 1005 of the first node 111, or an application running on such processor.

The first node 111 is further configured to perform the processing of Action 702 action, e.g. by means of a processing unit 1002 within the first node 111, configured to process provision of an IMS service across the first communications network 101 and the second communications network 201, to the device 230 configured to operate in the visited network. The processing is configured to be based on the identifier configured to be obtained. The processing being further configured to comprise, in the home network, one of: i) application of a policy or rule, and b) routing a communication to an S-CSCF. The processing unit 1002 may be a processor 1005 of the first node 111, or an application running on such processor.

The first node 111 may be configured to perform the providing of Action 703, e.g. by means of a providing unit 1003 within the first node 111, configured to provide the indication of the unique identifier configured to be obtained to the second node 112 in one of the first communications network 101 and the second communications network 201. The providing unit 1003 may be the processor 1005 of the first node 111, or an application running on such processor.

In some embodiments, the subscriber identifier may be configured to be an IMSI Series or an IBN corresponding to the second communications network 201.

In some embodiments, the subscriber identifier may be configured to be an IANA organization identity or a NAI corresponding to the second communications network 201.

In some embodiments, the processing may comprise registering the device 230 configured to be roaming in the second communications network 201 as Visited PLMN, and the identifier configured to be obtained may be configured to be a PVNI.

In some embodiments, the first communications network 101 may be configured to comprise a Home Routed Roaming Architecture.

In some embodiments, the processing may be configured to comprise registering the device 230 configured to be roaming from the second communications network 201 as Home PLMN.

In some embodiments, the first communications network 101 may be configured to comprise an LBO architecture.

In some embodiments, the obtaining may be configured to be performed prior to generating Session Initiation Protocol signalling towards a) an IMS core in the first communications network 101 or b) an Application Server in the first communications network 101.

In some embodiments, at least one of the first communications network 101 and the second communications network 201 may be configured to be a 5G network or an LTE network.

Other units 1004 may be comprised in the first node 111.

The embodiments herein in the first node 111 may be implemented through one or more processors, such as a processor 1005 in the first node 111 depicted in FIG. 10a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the first node 111. One such carrier may be in the form of a CD ROM disc. It is however feasible with other data carriers such as a memory stick. The computer program code may furthermore be provided as pure program code on a server and downloaded to the first node 111.

The first node 111 may further comprise a memory 1006 comprising one or more memory units. The memory 1006 is arranged to be used to store obtained information, store data, configurations, schedulings, and applications etc. to perform the methods herein when being executed in the first node 111.

In some embodiments, the first node 111 may receive information from, e.g., the second node 112, the device 230, or any other node, through a receiving port 1007. In some embodiments, the receiving port 1007 may be, for example, connected to one or more antennas in first node 111. In other embodiments, the first node 111 may receive information from another structure in the communications network 100 through the receiving port 1007. Since the receiving port 1007 may be in communication with the processor 1005, the receiving port 1007 may then send the received information to the processor 1005. The receiving port 1007 may also be configured to receive other information.

The processor 1005 in the first node 111 may be further configured to transmit or send information to e.g., the second node 112, the device 230, or any other node, or another structure in the communications network 100, through a sending port 1008, which may be in communication with the processor 1005, and the memory 1006.

Those skilled in the art will also appreciate that the units 1001-1004 described above may refer to a combination of analog and digital circuits, and/or one or more processors configured with software and/or firmware, e.g., stored in memory, that, when executed by the one or more processors such as the processor 1005, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 1001-1004 described above may be implemented as one or more applications running on one or more processors such as the processor 1005.

Thus, the methods according to the embodiments described herein for the first node 111 may be respectively implemented by means of a computer program 1009 product, comprising instructions, i.e., software code portions, which, when executed on at least one processor 1005, cause the at least one processor 1005 to carry out the actions described herein, as performed by the first node 111. The computer program 1009 product may be stored on a computer-readable storage medium 1010. The computer-readable storage medium 1010, having stored thereon the computer program 1009, may comprise instructions which, when executed on at least one processor 1005, cause the at least one processor 1005 to carry out the actions described herein, as performed by the first node 111. In some embodiments, the computer-readable storage medium 1010 may be a non-transitory computer-readable storage medium, such as a CD ROM disc, or a memory stick. In other embodiments, the computer program 1009 product may be stored on a carrier containing the computer program 1009 just described, wherein the carrier is one of an electronic signal, optical signal, radio signal, or the computer-readable storage medium 1010, as described above.

The first node 111 may comprise a communication interface configured to facilitate communications between the first node 111 and other nodes or devices, e.g., the second node 112, the device 230, or any other node. The interface may, for example, include a transceiver configured to transmit and receive radio signals over an air interface in accordance with a suitable standard.

In other embodiments, the first node 111 may comprise the following arrangement depicted in FIG. 10b. The first node 111 may comprise a processing circuitry 1005, e.g., one or more processors such as the processor 1005, in the first node 111 and the memory 1006. The first node 111 may also comprise a radio circuitry 1011, which may comprise e.g., the receiving port 1007 and the sending port 1008. The processing circuitry 1005 may be configured to, or operable to, perform the method actions according to FIG. 7, FIG. 9 and/or FIGS. 13-17, in a similar manner as that described in relation to FIG. 10a. The radio circuitry 1011 may be configured to set up and maintain at least a wireless connection with the second node 112, the device 230, and/or any other node. Circuitry may be understood herein as a hardware component.

Figure 11:
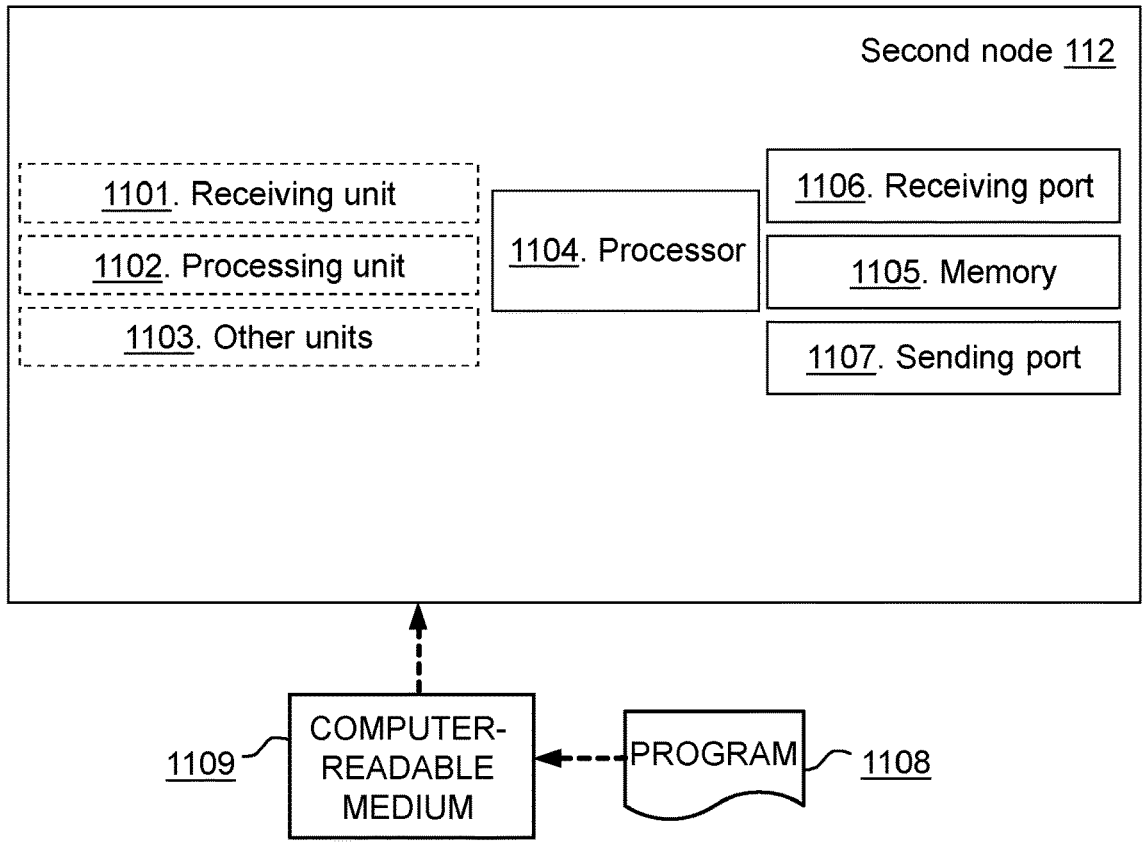
FIG. 11 is a schematic block diagram illustrating two non-limiting examples, a) and b), of a second node, according to embodiments herein.
Figure 11:
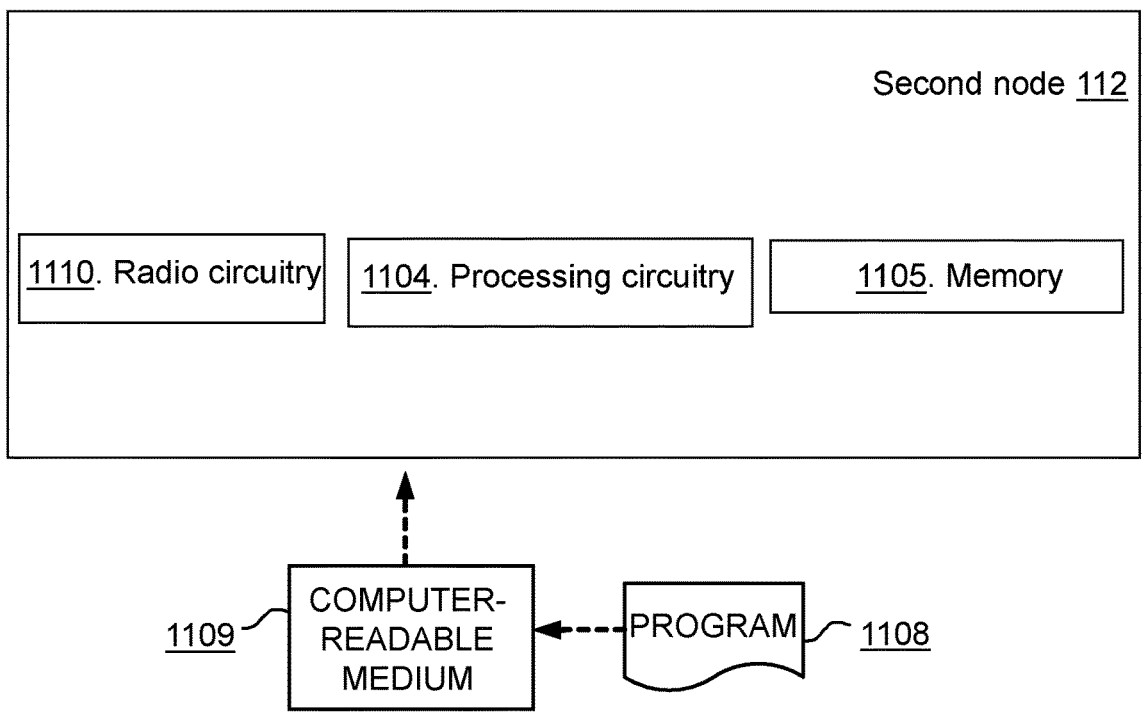

Hence, embodiments herein also relate to the first node 111 operative to operate in the communications network 100. The first node 111 may comprise the processing circuitry 1005 and the memory 1006, said memory 1006 containing instructions executable by said processing circuitry 1005, whereby the first node 111 is further operative to perform the actions described herein in relation to the first node 111, e.g., in FIG. 7, FIG. 9 and/or FIG. 11 depicts two different examples in panels a) and b), respectively, of the arrangement that the second node 112 may comprise. In some embodiments, the second node 112 may comprise the following arrangement depicted in FIG. 11a. The second node 112 may be understood to be for handling identification of the second communications network 201. The second node 112 is configured to operate in one of the first communications network 101 and the second communications network 201. One of the first communications network 101 and the second communications network 201 is configured to be the home network and the other of the first communications network 101 and the second communications network 201 is configured to be the visited network. Several embodiments are comprised herein. Several embodiments are comprised herein. Components from one embodiment may be tacitly assumed to be present in another embodiment and it will be obvious to a person skilled in the art how those components may be used in the other exemplary embodiments. The detailed description of some of the following corresponds to the same references provided above, in relation to the actions described for the second node 112 and will thus not be repeated here. For example, the IMS service may be based on a SIP, e.g., on SIP information or signalling.

In FIG. 11, optional units are indicated with dashed boxes.

The second node 112 is configured to perform the receiving of Action 801, e.g. by means of a receiving unit 1101 within the second node 112, configured to receive the indication of the unique identifier. The unique identifier is configured to uniquely identify the second communications network 201 in the plurality of communications networks 200 sharing the Mobile Network identifier. The unique identifier is further configured to be based on: a) an MCC and a MNC, corresponding to a shared PLMN identifier, and b) a subscriber identifier corresponding to the second communications network 201. The receiving unit 1101 may be the processor 1104 of the second node 112, or an application running on such processor.

The second node 112 may be also configured to perform the processing of Action 802, e.g., by means of the processing unit 1101 within the second node 112, configured to process provision of an IMS service across the first communications network 101 and the second communications network 201, to the device 230 configured to operate in the visited network. The processing is configured to be based on the identifier configured to be received. The receiving unit 1101 may be the processor 1104 of the second node 112, or an application running on such processor.

In some embodiments, the subscriber identifier may be configured to be an IMSI Series or an IBN corresponding to the second communications network 201.

In some embodiments, the subscriber identifier may be configured to be an IANA organization identity or a NAI corresponding to the second communications network 201.

In some embodiments, the indicated identifier may be configured to be a PVNI.

In some embodiments, the first communications network 101 may be configured to comprise a Home Routed Roaming Architecture.

In some embodiments, the first communications network 101 may be configured to comprise an LBO architecture.

In some embodiments, the obtaining may be configured to be performed prior to generating Session Initiation Protocol signalling towards a) an IMS core in the first communications network 101 or b) an Application Server in the first communications network 101.

In some embodiments, at least one of the first communications network 101 and the second communications network 201 may be configured to be a 5G network or an LTE network.

Other units 1103 may be comprised in the second node 112.

The embodiments herein in the second node 112 may be implemented through one or more processors, such as a processor 1104 in the second node 112 depicted in FIG. 11a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the second node 112. One such carrier may be in the form of a CD ROM disc. It is however feasible with other data carriers such as a memory stick. The computer program code may furthermore be provided as pure program code on a server and downloaded to the second node 112.

The second node 112 may further comprise a memory 1105 comprising one or more memory units. The memory 1105 is arranged to be used to store obtained information, store data, configurations, schedulings, and applications etc. to perform the methods herein when being executed in the second node 112.

In some embodiments, the second node 112 may receive information from, e.g., the first node 111, the device 230, or any other node, through a receiving port 1106. In some embodiments, the receiving port 1106 may be, for example, connected to one or more antennas in the second node 112. In other embodiments, the second node 112 may receive information from another structure in the communications network 100 through the receiving port 1106. Since the receiving port 1106 may be in communication with the processor 1104, the receiving port 1106 may then send the received information to the processor 1104. The receiving port 1106 may also be configured to receive other information.

The processor 1104 in the second node 112 may be further configured to transmit or send information to e.g., the first node 111, the device 230, or any other node, or another structure in the communications network 100, through a sending port 1107, which may be in communication with the processor 1104, and the memory 1105.

Those skilled in the art will also appreciate that the units 1101-1103 described above may refer to a combination of analog and digital circuits, and/or one or more processors configured with software and/or firmware, e.g., stored in memory, that, when executed by the one or more processors such as the processor 1104, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 1101-1103 described above may be implemented as one or more applications running on one or more processors such as the processor 1104.

Thus, the methods according to the embodiments described herein for the second node 112 may be respectively implemented by means of a computer program 1108 product, comprising instructions, i.e., software code portions, which, when executed on at least one processor 1104, cause the at least one processor 1104 to carry out the actions described herein, as performed by the second node 112. The computer program 1108 product may be stored on a computer-readable storage medium 1109. The computer-readable storage medium 1109, having stored thereon the computer program 1108, may comprise instructions which, when executed on at least one processor 1104, cause the at least one processor 1104 to carry out the actions described herein, as performed by the second node 112. In some embodiments, the computer-readable storage medium 1109 may be a non-transitory computer-readable storage medium, such as a CD ROM disc, or a memory stick. In other embodiments, the computer program 1108 product may be stored on a carrier containing the computer program 1108 just described, wherein the carrier is one of an electronic signal, optical signal, radio signal, or the computer-readable storage medium 1109, as described above.

The second node 112 may comprise a communication interface configured to facilitate communications between the second node 112 and other nodes or devices, e.g., the first node 111, the device 230, or any other node, or another structure. The interface may, for example, include a transceiver configured to transmit and receive radio signals over an air interface in accordance with a suitable standard.

In other embodiments, the second node 112 may comprise the following arrangement depicted in FIG. 11b. The second node 112 may comprise a processing circuitry 1104, e.g., one or more processors such as the processor 1104, in the second node 112 and the memory 1105. The second node 112 may also comprise a radio circuitry 1210, which may comprise e.g., the receiving port 1106 and the sending port 1107. The processing circuitry 1104 may be configured to, or operable to, perform the method actions according to FIG. 8, FIG. 9 and/or FIGS. 13-17, in a similar manner as that described in relation to FIG. 11a. The radio circuitry 1210 may be configured to set up and maintain at least a wireless connection with the first node 111, the device 230, and/or any other node. Circuitry may be understood herein as a hardware component.

Hence, embodiments herein also relate to the second node 112 operative to operate in the communications network 100. The second node 112 may comprise the processing circuitry 1104 and the memory 1105, said memory 1105 containing instructions executable by said processing circuitry 1104, whereby the second node 112 is further operative to perform the actions described herein in relation to the second node 112, e.g., in FIG. 8, FIG. 9 and/or FIGS. 13-17.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

When using the word "comprise" or "comprising" it shall be interpreted as non-limiting, i.e. meaning "consist at least of".

A processor may be understood herein as a hardware component.

The embodiments herein are not limited to the above described preferred embodiments. Various alternatives, modifications and equivalents may be used. Therefore, the above embodiments should not be taken as limiting the scope of the invention.

FURTHER EXTENSIONS AND VARIATIONS

Figure 12:
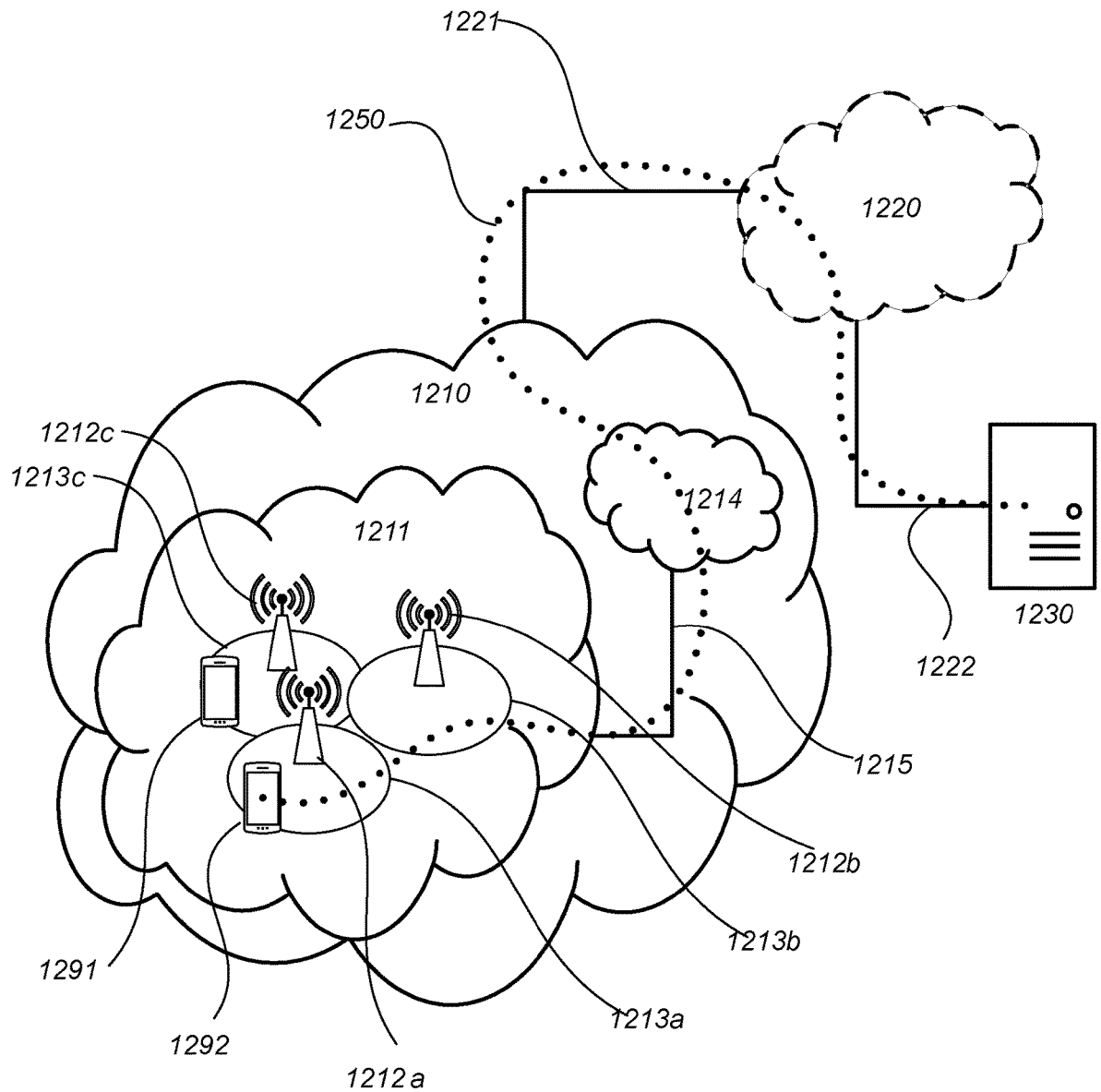
FIG. 12 is a schematic block diagram illustrating a telecommunication network connected via an intermediate network to a host computer, according to embodiments herein.

FIG. 12: Telecommunication Network Connected Via an Intermediate Network to a Host Computer in Accordance with Some Embodiments With reference to FIG. 12, in accordance with an embodiment, a communication system includes telecommunication network 1210 such as any of the first communications network 101 and the second communications network 201, for example, a 3GPP-type cellular network, which comprises access network 1211, such as a radio access network, and core network 1214. The core network 1214 comprises a plurality of nodes such as any of the first node 111 and/or the second node 112. Access network 1211 comprises a plurality of base stations 1212a, 1212b, 1212c, such as NBs, eNBs, gNBs or other types of wireless access points, each defining a corresponding coverage area 1213a, 1213b, 1213c. Each base station 1212a, 1212b, 1212c is connectable to core network 1214 over a wired or wireless connection 1215. In FIG. 12, a first UE 1291 located in coverage area 1213c is configured to wirelessly connect to, or be paged by, the corresponding base station 1212c. A second UE 1292 in coverage area 1213a is wirelessly connectable to the corresponding base station 1212a. While a plurality of UEs 1291, 1292 are illustrated in this example, the disclosed embodiments are equally applicable to a situation where a sole UE is in the coverage area or where a sole UE is connecting to the corresponding base station 1212. Any of the UEs 1291, 1292 may be considered to act as examples of the device 230.

Telecommunication network 1210 is itself connected to host computer 1230, which may be embodied in the hardware and/or software of a standalone server, a cloud-implemented server, a distributed server or as processing resources in a server farm. Host computer 1230 may be under the ownership or control of a service provider, or may be operated by the service provider or on behalf of the service provider. Connections 1221 and 1222 between telecommunication network 1210 and host computer 1230 may extend directly from core network 1214 to host computer 1230 or may go via an optional intermediate network 1220. Intermediate network 1220 may be one of, or a combination of more than one of, a public, private or hosted network; intermediate network 1220, if any, may be a backbone network or the Internet; in particular, intermediate network 1220 may comprise two or more sub-networks (not shown).

The communication system of FIG. 12 as a whole enables connectivity between the connected UEs 1291, 1292 and host computer 1230. The connectivity may be described as an over-the-top (OTT) connection 1250. Host computer 1230 and the connected UEs 1291, 1292 are configured to communicate data and/or signaling via OTT connection 1250, using access network 1211, core network 1214, any intermediate network 1220 and possible further infrastructure (not shown) as intermediaries. OTT connection 1250 may be transparent in the sense that the participating communication devices through which OTT connection 1250 passes are unaware of routing of uplink and downlink communications. For example, base station 1212 may not or need not be informed about the past routing of an incoming downlink communication with data originating from host computer 1230 to be forwarded (e.g., handed over) to a connected UE 1291. Similarly, base station 1212 need not be aware of the future routing of an outgoing uplink communication originating from the UE 1291 towards the host computer 1230.

In relation to FIGS. 13, 14, 15, 16, and 17, which are described next, it may be understood that a UE may be considered to be an examples of the device 230, and that any description provided for the UE equally applies to the device 230. It may be also understood that a core network node is an example of any of the first node 111, and/or the second node 112, and that any description provided for the core network node equally applies to any of the first node 111, and/or the second node 112.

Figure 13:
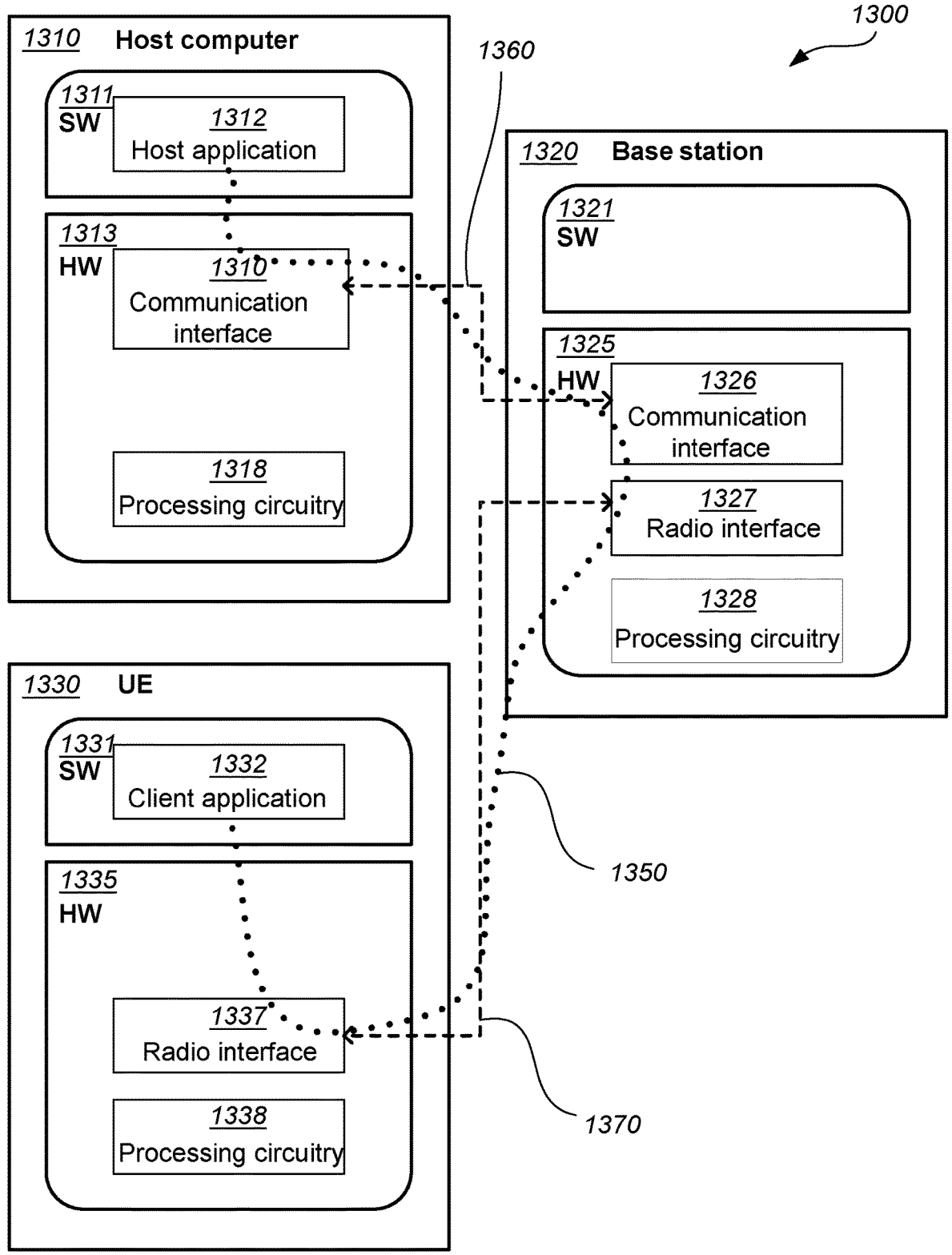
FIG. 13 is a generalized block diagram of a host computer communicating via a base station with a user equipment over a partially wireless connection, according to embodiments herein.

FIG. 13: Host Computer Communicating Via a Base Station with a User Equipment Over a Partially Wireless Connection in Accordance with Some Embodiments Example implementations, in accordance with an embodiment, of the UE, as an example of the device 230, a base station and host computer discussed in the preceding paragraphs will now be described with reference to FIG. 13. In communication system 1300, such as any of the first communications network 101 and the second communications network 201, host computer 1310 comprises hardware 1315 including communication interface 1316 configured to set up and maintain a wired or wireless connection with an interface of a different communication device of communication system 1300. Host computer 1310 further comprises processing circuitry 1318, which may have storage and/or processing capabilities. In particular, processing circuitry 1318 may comprise one or more programmable processors, application-specific integrated circuits, field programmable gate arrays or combinations of these (not shown) adapted to execute instructions. Host computer 1310 further comprises software 1311, which is stored in or accessible by host computer 1310 and executable by processing circuitry 1318. Software 1311 includes host application 1312. Host application 1312 may be operable to provide a service to a remote user, such as UE 1330 connecting via OTT connection 1350 terminating at UE 1330 and host computer 1310. In providing the service to the remote user, host application 1312 may provide user data which is transmitted using OTT connection 1350.

Communication system 1300 further includes a base station 1320 provided in a telecommunication system and comprising hardware 1325 enabling it to communicate with host computer 1310 and with UE 1330. Hardware 1325 may include communication interface 1326 for setting up and maintaining a wired or wireless connection with an interface of a different communication device of communication system 1300, as well as radio interface 1327 for setting up and maintaining at least wireless connection 1370 with UE 1330 located in a coverage area (not shown in FIG. 13) served by base station 1320. Communication interface 1326 may be configured to facilitate connection 1360 to host computer 1310. Connection 1360 may be direct or it may pass through a core network (not shown in FIG. 13) of the telecommunication system and/or through one or more intermediate networks outside the telecommunication system. In the embodiment shown, hardware 1325 of base station 1320 further includes processing circuitry 1328, which may comprise one or more programmable processors, application-specific integrated circuits, field programmable gate arrays or combinations of these (not shown) adapted to execute instructions. Base station 1320 further has software 1321 stored internally or accessible via an external connection.

Communication system 1300 further includes UE 1330 already referred to. Its hardware 1335 may include radio interface 1337 configured to set up and maintain wireless connection 1370 with a base station serving a coverage area in which UE 1330 is currently located. Hardware 1335 of UE 1330 further includes processing circuitry 1338, which may comprise one or more programmable processors, application-specific integrated circuits, field programmable gate arrays or combinations of these (not shown) adapted to execute instructions. UE 1330 further comprises software 1331, which is stored in or accessible by UE 1330 and executable by processing circuitry 1338. Software 1331 includes client application 1332. Client application 1332 may be operable to provide a service to a human or non-human user via UE 1330, with the support of host computer 1310. In host computer 1310, an executing host application 1312 may communicate with the executing client application 1332 via OTT connection 1350 terminating at UE 1330 and host computer 1310. In providing the service to the user, client application 1332 may receive request data from host application 1312 and provide user data in response to the request data. OTT connection 1350 may transfer both the request data and the user data. Client application 1332 may interact with the user to generate the user data that it provides.

It is noted that host computer 1310, base station 1320 and UE 1330 illustrated in FIG. 13 may be similar or identical to host computer 1230, one of base stations 1212a, 1212b, 1212c and one of UEs 1291, 1292 of FIG. 12, respectively. This is to say, the inner workings of these entities may be as shown in FIG. 13 and independently, the surrounding network topology may be that of FIG. 12.

In FIG. 13, OTT connection 1350 has been drawn abstractly to illustrate the communication between host computer 1310 and UE 1330 via base station 1320, without explicit reference to any intermediary devices and the precise routing of messages via these devices. Network infrastructure may determine the routing, which it may be configured to hide from UE 1330 or from the service provider operating host computer 1310, or both. While OTT connection 1350 is active, the network infrastructure may further take decisions by which it dynamically changes the routing (e.g., on the basis of load balancing consideration or reconfiguration of the network).

Wireless connection 1370 between UE 1330 and base station 1320 is in accordance with the teachings of the embodiments described throughout this disclosure. One or more of the various embodiments improve the performance of OTT services provided to UE 1330 using OTT connection 1350, in which wireless connection 1370 forms the last segment. More precisely, the teachings of these embodiments may improve the latency, signalling overhead, and service interruption and thereby provide benefits such as reduced user waiting time, better responsiveness and extended battery lifetime.

A measurement procedure may be provided for the purpose of monitoring data rate, latency and other factors on which the one or more embodiments improve. There may further be an optional network functionality for reconfiguring OTT connection 1350 between host computer 1310 and UE 1330, in response to variations in the measurement results. The measurement procedure and/or the network functionality for reconfiguring OTT connection 1350 may be implemented in software 1311 and hardware 1315 of host computer 1310 or in software 1331 and hardware 1335 of UE 1330, or both. In embodiments, sensors (not shown) may be deployed in or in association with communication devices through which OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of OTT connection 1350 may include message format, retransmission settings, preferred routing etc.; the reconfiguring need not affect base station 1320, and it may be unknown or imperceptible to base station 1320. Such procedures and functionalities may be known and practiced in the art. In certain embodiments, measurements may involve proprietary UE signaling facilitating host computer 1310's measurements of throughput, propagation times, latency and the like. The measurements may be implemented in that software 1311 and 1331 causes messages to be transmitted, in particular empty or 'dummy' messages, using OTT connection 1350 while it monitors propagation times, errors etc.

FIG. 14: Methods Implemented in a Communication System Including a Host Computer, a Base Station and a User Equipment in Accordance with Some Embodiments FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1410, the host computer provides user data. In substep 1411 (which may be optional) of step 1410, the host computer provides the user data by executing a host application. In step 1420, the host computer initiates a transmission carrying the user data to the UE. In step 1430 (which may be optional), the base station transmits to the UE the user data which was carried in the transmission that the host computer initiated, in accordance with the teachings of the embodiments described throughout this disclosure. In step 1440 (which may also be optional), the UE executes a client application associated with the host application executed by the host computer.

The first node 111 embodiments relate to FIG. 6, FIG. 7, FIG. 9, FIG. 10 and FIGS. 12-17.

The first node 111 may comprise an interface unit to facilitate communications between the first node 111 and other nodes or devices, e.g., the second node 112, the device 230, the host computer 1310, or any of the other nodes. In some particular examples, the interface may, for example, include a transceiver configured to transmit and receive radio signals over an air interface in accordance with a suitable standard.

The first node 111 may comprise an arrangement as shown in FIG. 10 or in FIG. 13.

The first node 111 may also be configured to communicate user data with a host application unit in a host computer 1310, e.g., via another link such as 1350.

The second node 112 embodiments relate to FIG. 6, FIG. 8, FIG. 9, FIG. 11 and FIGS. 12-17.

The second node 112 may comprise an interface unit to facilitate communications between the second node 112 and other nodes or devices, e.g., the first node 111, the device 230, the host computer 1310, or any of the other nodes. In some particular examples, the interface may, for example, include a transceiver configured to transmit and receive radio signals over an air interface in accordance with a suitable standard.

The second node 112 may also be configured to communicate user data with a host application unit in a host computer 1310, e.g., via another link such as 1350.

The second node 112 may comprise an arrangement as shown in FIG. 11 or in FIG. 13.

FIG. 15: Methods Implemented in a Communication System Including a Host Computer, a Base Station and a User Equipment in Accordance with Some Embodiments FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1510 of the method, the host computer provides user data. In an optional substep (not shown) the host computer provides the user data by executing a host application. In step 1520, the host computer initiates a transmission carrying the user data to the UE. The transmission may pass via the base station, in accordance with the teachings of the embodiments described throughout this disclosure. In step 1530 (which may be optional), the UE receives the user data carried in the transmission.

FIG. 16: Methods Implemented in a Communication System Including a Host Computer, a Base Station and a User Equipment in Accordance with Some Embodiments FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1610 (which may be optional), the UE receives input data provided by the host computer. Additionally or alternatively, in step 1620, the UE provides user data. In substep 1621 (which may be optional) of step 1620, the UE provides the user data by executing a client application. In substep 1611 (which may be optional) of step 1610, the UE executes a client application which provides the user data in reaction to the received input data provided by the host computer. In providing the user data, the executed client application may further consider user input received from the user. Regardless of the specific manner in which the user data was provided, the UE initiates, in substep 1630 (which may be optional), transmission of the user data to the host computer. In step 1640 of the method, the host computer receives the user data transmitted from the UE, in accordance with the teachings of the embodiments described throughout this disclosure.

FIG. 17: Methods Implemented in a Communication System Including a Host Computer, a Base Station and a User Equipment in Accordance with Some Embodiments FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1710 (which may be optional), in accordance with the teachings of the embodiments described throughout this disclosure, the base station receives user data from the UE. In step 1720 (which may be optional), the base station initiates transmission of the received user data to the host computer. In step 1730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

REFERENCES

1. CBRSA-TR-0100 V1.0.0 Identifier Guidelines for Shared HNI.docx

The invention claimed is:

1. A method performed by a first node, the first node managing a Proxy-Call Session Control Function in a first communications network, the method being for handling identification of a second communications network, wherein one of the first communications network and the second communications network is a home network and the other of the first communications network and the second communications network is a visited network, the method comprising:

obtaining a unique identifier, the unique identifier uniquely identifying the second communications network in a plurality of communications networks sharing a Mobile Network identifier, the unique identifier being based on:
a Mobile Country Code (MCC) and a Mobile Network Code (MNC) corresponding to a shared Public Land Mobile Network identifier, and
a subscriber identifier corresponding to the second communications network, and processing provision of an IP Multimedia Subsystem service across the first communications network and the second communications network, to a device operating in the visited network, the processing being based on the obtained identifier, the processing comprising, in the home network, one of:
application of a policy or rule, and
routing a communication to a Serving-Call Session Control Function (S-CSCF).

2. The method according to claim 1, further comprising: providing an indication of the obtained unique identifier to a second node in one of the first communications network and the second communications network.

3. The method according to claim 1, wherein the subscriber identifier is an International Mobile Subscriber Identity (IMSI) Series or an IMSI Block Number (IBN) corresponding to the second communications network.

4. The method according to claim 1, wherein the subscriber identifier is an Internet Assigned Numbers Authority (IANA) organization identity or a Network Access Identifier (NAI) corresponding to the second communications network.

5. The method according to claim 1, wherein the processing comprises registering the device roaming in the second communications network as Visited Public Land Mobile Network (PLMN) and wherein the obtained identifier is a Private-Visited Network Identifier (PVNI).

6. The method according to claim 1, wherein the first communications network comprises a Home Routed Roaming Architecture.

7. The method according to claim 1, wherein the processing comprises registering the device roaming from the second communications network as Home PLMN.

8. The method according to claim 7, wherein the first communications network comprises a Local BreakOut (LBO) architecture.

9. The method according to claim 1, wherein the obtaining is performed prior to generating Session Initiation Protocol signalling towards a) an Internet Protocol Multimedia Subsystem (IMS) core in the first communications network or b) an Application Server in the first communications network.

10. The method according to claim 1, wherein at least one of the first communications network and the second communications network is a Fifth Generation (5G) network or a Long Term Evolution (LTE) network.

11. A method performed by a second node, the method being for handling identification of a second communications network, the second node operating in one of a first communications network and the second communications network, wherein one of the first communications network and the second communications network is a home network and the other of the first communications network and the second communications network is a visited network, the method comprising:
receiving an indication of a unique identifier, the unique identifier uniquely identifying the second communications network in a plurality of communications networks sharing a Mobile Network identifier, the unique identifier being based on:
a Mobile Country Code (MCC) and a Mobile Network Code (MNC) corresponding to a shared Public Land Mobile Network identifier, and
a subscriber identifier corresponding to the second communications network, and
processing provision of an IP Multimedia Subsystem service across the first communications network and the second communications network, to a device operating in the visited network, the processing being based on the received identifier.

12. The method according to claim 11, wherein the subscriber identifier is an International Mobile Subscriber Identity (IMSI) Series or an IMSI Block Number (IBN) corresponding to the second communications network.

13. The method according to claim 11, wherein the subscriber identifier is an Internet Assigned Numbers Authority (IANA) organization identity or a Network Access Identifier (NAI) corresponding to the second communications network.

14. The method according to claim 11, wherein the indicated identifier is a Private-Visited Network Identifier (PVNI).

15. The method according to claim 14, wherein the first communications network comprises a Home Routed Roaming Architecture.

16. The method according to claim 11, wherein the first communications network comprises a Local BreakOut (LBO) architecture.

17. The method according to claim 11, wherein the obtaining is performed prior to generating Session Initiation Protocol signalling towards a) an Internet Protocol Multimedia Subsystem (IMS) core in the first communications network or b) an Application Server in the first communications network.

18. The method according to claim 11, wherein at least one of the first communications network and the second communications network is a Fifth Generation (5G) network or a Long Term Evolution (LTE) network.

19. A first node configured to manage a Proxy-Call Session Control Function in a first communications network, the first node being for handling identification of a second communications network, wherein one of the first communications network and the second communications network is configured to be a home network and the other of the first communications network and the second communications network is configured to be a visited network, the first node being further configured to:
obtain a unique identifier, the unique identifier being configured to uniquely identify the second communications network in a plurality of communications networks configured to share a Mobile Network identifier, the unique identifier being configured to be based on:
a Mobile Country Code (MCC) and a Mobile Network Code (MNC) configured to correspond to a shared Public Land Mobile Network identifier, and
a subscriber identifier configured to correspond to the second communications network, and
process provision of an IP Multimedia Subsystem service across the first communications network and the second communications network, to a device configured to operate in the visited network, the processing being configured to be based on the identifier configured to be obtained, and the processing being further configured to comprise, in the home network, one of:
application of a policy or rule, and
routing a communication to a Serving-Call Session Control Function (S-CSCF).

20. The first node according to claim 19, being further configured to:
provide an indication of the unique identifier configured to be obtained to a second node in one of the first communications network and the second communications network.

21. The first node according to claim 19, wherein the subscriber identifier is configured to be an International Mobile Subscriber Identity (IMSI) Series or an IMSI Block Number (IBN) corresponding to the second communications network.

22. The first node according to claim 19, wherein the subscriber identifier is configured to be an Internet Assigned Numbers Authority (IANA) organization identity or a Network Access Identifier (NAI) corresponding to the second communications network.

23. The first node according to claim 19, wherein the processing comprises registering the device configured to be roaming in the second communications network as Visited Public Land Mobile Network (PLMN) and wherein the identifier configured to be obtained is configured to be a Private-Visited Network Identifier (PVNI).

24. The first node according to claim 19, wherein the first communications network is configured to comprise a Home Routed Roaming Architecture.

25. The first node according to claim 19, wherein the processing is configured to comprise registering the device configured to be roaming from the second communications network as Home PLMN.

26. The first node according to claim 25, wherein the first communications network is configured to comprise a Local BreakOut (LBO) architecture.

27. The first node according to claim 19, wherein the obtaining is configured to be performed prior to generating Session Initiation Protocol signalling towards a) an Internet Protocol Multimedia Subsystem (IMS) core in the first communications network or b) an Application Server in the first communications network.

28. The first node according to claim 19, wherein at least one of the first communications network and the second communications network is configured to be a Fifth Generation (5G) network or a Long Term Evolution (LTE) network.

29. A second node, for handling identification of a second communications network, the second node configured to operate in one of a first communications network and the second communications network, wherein one of the first communications network and the second communications network is configured to be a home network and the other of the first communications network and the second communications network is configured to be a visited network, the second node being further configured to:
receive an indication of a unique identifier, the unique identifier being configured to uniquely identify the second communications network in a plurality of communications networks sharing a Mobile Network identifier, the unique identifier being further configured to be based on:
a Mobile Country Code (MCC) and a Mobile Network Code (MNC) corresponding to a shared Public Land Mobile Network identifier, and
a subscriber identifier corresponding to the second communications network, and
process provision of an IP Multimedia Subsystem service across the first communications network and the second communications network, to a device configured to operate in the visited network, the processing being configured to be based on the identifier configured to be received.

30. The second node according to claim 29, wherein the subscriber identifier is configured to be an International Mobile Subscriber Identity (IMSI) Series or an IMSI Block Number (IBN) corresponding to the second communications network.

31. The second node according to claim 29, wherein the subscriber identifier is configured to be an Internet Assigned Numbers Authority (IANA) organization identity or a Network Access Identifier (NAI) corresponding to the second communications network.

32. The second node according to claim 29, wherein the indicated identifier is configured to be a Private-Visited Network Identifier (PVNI).

33. The second node according to claim 32, wherein the first communications network is configured to comprise a Home Routed Roaming Architecture.

34. The second node according to claim 29, wherein the first communications network is configured to comprise a Local BreakOut (LBO) architecture.

35. The second node according to claim 29, wherein the obtaining is configured to be performed prior to generating Session Initiation Protocol signalling towards a) an Internet Protocol Multimedia Subsystem (IMS) core in the first communications network or b) an Application Server in the first communications network.

36. The second node according to claim 29, wherein at least one of the first communications network and the second communications network is configured to be a Fifth Generation 5G, network or a Long Term Evolution (LTE) network.

* * * * *